(12) United States Patent
Bannister et al.

(10) Patent No.: US 11,805,107 B2
(45) Date of Patent: Oct. 31, 2023

(54) EXTRACTING ENCRYPTION KEYS TO ENABLE MONITORING SERVICES

(71) Applicant: Nubeva, Inc., San Jose, CA (US)

(72) Inventors: Greig W. Bannister, Allambie Heights (AU); Randy Yen-pang Chou, San Jose, CA (US)

(73) Assignee: Nubeva, Inc., San Jose, CA (US)

( * ) Notice: Subject to any disclaimer, the term of this patent is extended or adjusted under 35 U.S.C. 154(b) by 642 days.

(21) Appl. No.: 16/843,840

(22) Filed: Apr. 8, 2020

(65) Prior Publication Data

US 2020/0236093 A1 Jul. 23, 2020

Related U.S. Application Data

(63) Continuation-in-part of application No. 16/795,422, filed on Feb. 19, 2020, now Pat. No. 11,494,484, (Continued)

(51) Int. Cl.
| | |
|---|---|
| *H04L 9/40* | (2022.01) |
| *H04L 9/08* | (2006.01) |
| *G06F 9/54* | (2006.01) |
| *G06F 9/455* | (2018.01) |
| *H04L 9/32* | (2006.01) |

(52) U.S. Cl.
CPC ...... *H04L 63/0471* (2013.01); *G06F 9/45558* (2013.01); *G06F 9/545* (2013.01); *H04L 9/0825* (2013.01); *H04L 9/0841* (2013.01); *H04L 9/0861* (2013.01); *H04L 9/0894* (2013.01); *H04L 9/3263* (2013.01); (Continued)

(58) Field of Classification Search
CPC ............. G06F 9/545; G06F 9/45558; G06F 2009/45587; G06F 2009/45595; H04L 9/0825; H04L 9/0841; H04L 9/0861; H04L 9/0894; H04L 9/3263; H04L 63/1425
See application file for complete search history.

(56) References Cited

U.S. PATENT DOCUMENTS

| | | | |
|---|---|---|---|
| 8,627,422 B2 * | 1/2014 | Hawkes | H04L 63/0869 380/255 |
| 8,838,957 B2 * | 9/2014 | Chou | H04L 63/166 713/151 |

(Continued)

OTHER PUBLICATIONS

De la Hoz, Enrique, et al. "Detecting and defeating advanced man-in-the-middle attacks against TLS." 2014 6th International Conference on Cyber Conflict (CyCon 2014). IEEE, 2014 (Year: 2014).*

(Continued)

*Primary Examiner* — Syed A Zaidi
(74) *Attorney, Agent, or Firm* — Mark Spiller

(57) ABSTRACT

The disclosed embodiments disclose techniques for extracting encryption keys to enable monitoring services. During operation, an encrypted connection is detected on a computing device. A monitoring service harvests an encryption key for this encrypted connection from the memory of a computing device and then forwards the encryption key to (Continued)

an intercepting agent in an intermediate computing environment that intercepts encrypted traffic that is sent between the computing device and a remote service via the encrypted connection.

8 Claims, 13 Drawing Sheets

Related U.S. Application Data which is a continuation-in-part of application No. 15/842,848, filed on Dec. 14, 2017, now Pat. No. 10,608,995, which is a continuation-in-part of application No. 15/792,679, filed on Oct. 24, 2017, now Pat. No. 10,419,394.

(60) Provisional application No. 62/864,411, filed on Jun. 20, 2019, provisional application No. 62/412,171, filed on Oct. 24, 2016.

(52) U.S. Cl.
CPC ............ *H04L 63/1425* (2013.01); *G06F 2009/45587* (2013.01); *G06F 2009/45595* (2013.01)

(56) References Cited

U.S. PATENT DOCUMENTS

| | | | |
|---|---|---|---|
| 9,735,970 B1* | 8/2017 | Shohat | H04L 9/321 |
| 10,454,689 B1* | 10/2019 | Sharifi Mehr | H04L 63/166 |
| 10,805,087 B1* | 10/2020 | Allen | G06F 21/57 |
| 11,528,150 B1* | 12/2022 | Stapleton | H04L 9/3268 |
| 2011/0113244 A1* | 5/2011 | Chou | H04W 52/281 713/168 |
| 2011/0173439 A1* | 7/2011 | Chou | H04L 9/0844 713/150 |
| 2015/0128205 A1* | 5/2015 | Mahaffey | H04L 63/105 726/1 |
| 2015/0358161 A1* | 12/2015 | Kancharla | H04L 9/3234 713/164 |
| 2018/0183586 A1* | 6/2018 | Bhargav-Spantzel | G06F 21/32 |
| 2019/0199683 A1* | 6/2019 | Kenyan | H04L 63/0209 |

OTHER PUBLICATIONS

NPL Search Terms (Year: 2023).*

* cited by examiner

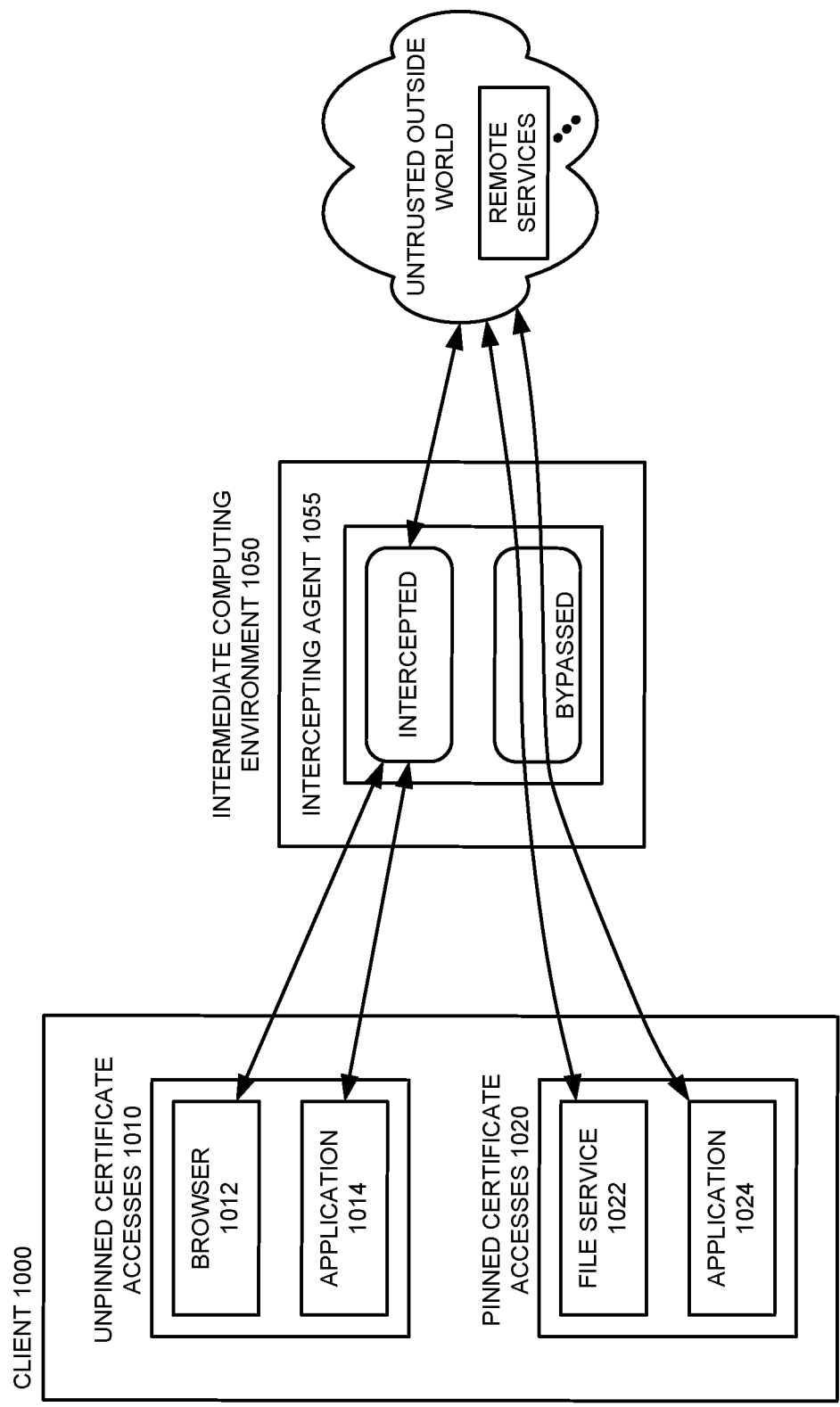

EXTRACTING ENCRYPTION KEYS TO ENABLE MONITORING SERVICES

RELATED APPLICATION

This application is a continuation-in-part of pending U.S. patent application Ser. No. 16/795,422, entitled "Leveraging Instrumentation Capabilities to Enable Monitoring Services", by inventors Greig W. Bannister and Randy Yen-pang Chou and filed on 19 Feb. 2020. U.S. patent application Ser. No. 16/795,422 is a continuation-in-part of U.S. Pat. No. 10,608,995 (formerly U.S. patent application Ser. No. 15/842,848), entitled "Optimizing Data Transfer Costs for Cloud-Based Security Services," by inventors Randy Yen-pang Chou and Greig W. Bannister and filed on 14 Dec. 2017. Application Ser. No. 15/842,848 is a continuation-in-part of U.S. Pat. No. 10,419,394 (formerly U.S. patent application Ser. No. 15/792,679), entitled "Providing Scalable Cloud-Based Security Services," by inventors Randy Yen-pang Chou and Greig W. Bannister and filed on 24 Oct. 2017. U.S. Pat. No. 10,419,394 claims priority under 35 U.S.C. § 119(e) to U.S. Provisional Patent Application No. 62/412,171, by inventors Randy Yen-pang Chou and Greig W. Bannister, entitled "Providing Scalable Cloud-Based Security Services," filed 24 Oct. 2016. This application also claims the benefit of U.S. Provisional Patent Application No. 62/864,411, by inventors Greig W. Bannister and Randy Yen-pang Chou, entitled "Leveraging Instrumentation Capabilities to Enable Cloud-Based Monitoring Services," filed 20 Jun. 2019. The contents of all of the above-referenced applications are hereby incorporated by reference.

BACKGROUND

Field of the Invention

This disclosure generally relates to techniques for monitoring computing devices to detect and prevent unauthorized behavior. More specifically, this disclosure relates to extracting encryption keys to enable monitoring services.

RELATED ART

Mobile devices, high-speed networks and cloud computing have led to distributed enterprise environments in which a majority of users work remotely from the company headquarters and access cloud-based applications. Unfortunately, traditional security practices that leverage physical access to computing devices and networking infrastructure to monitor user and application behavior become inadequate in such distributed environments. For instance, inter- and intra-cloud-service communication is usually encrypted and cannot be successfully inspected without the associated decryption keys, making it difficult for an enterprise to determine the data that even enterprise-approved and installed applications and services are sending across networks. Furthermore, each different network interaction with distinct remote targets may involve a different, distinct key, making it very difficult for an enterprise that has authorized and invoked distributed services to determine the specific data and requests that applications are sending to remote services. As the number of cloud-based services, requests, and data transfers grow, ensuring that vital enterprise data is protected from leaks or other malicious actions becomes increasingly difficult, which can leave an enterprise vulnerable.

Hence, what is needed are techniques for providing monitoring solutions without the above-described problems of existing techniques.

SUMMARY

The disclosed embodiments disclose techniques for extracting encryption keys to enable monitoring services. During operation, an encrypted connection is detected on a computing device. A monitoring service harvests an encryption key for this encrypted connection from the memory of a computing device and then forwards the encryption key to an intercepting agent in an intermediate computing environment that intercepts encrypted traffic that is sent between the computing device and a remote service via the encrypted connection.

In some embodiments, harvesting an encryption key involves: (1) determining an encryption service that executes on the computing device and supports encryption operations for other applications that execute on the computing device; (2) determining a memory region on the computing device that is allocated to the encryption service; and (3) scanning that memory region to find the encryption key.

In some embodiments, scanning the identified memory region involves: (1) determining a specific characteristic associated with encryption keys; (2) scanning the memory region to find instances of the specific characteristic and then searching the surrounding memory areas near those instances to find one or more encryption keys; and (3) then testing the encryption keys that are found in the manner to find an encryption key that matches the encrypted connection.

In some embodiments, harvesting an encryption key involves sending to the computing device's operating system kernel an instrumentation request that associates a sub-program with a target operation. Upon receiving a request from an application to perform the target operation, the operating system kernel executes the sub-program with kernel privileges in the process context of the application. Note that this sub-program is not part of the application, but is instead crafted using knowledge of application characteristics to analyze and/or traverse the runtime memory space associated with the application to extract a desired data value. This extracted data value is returned to at least one of a specified target process or target location.

In some embodiments, the target operation is a function call in a binary encryption library. When the application executes the function call to encrypt a message, the sub-program analyzes the application's memory space to extract this encryption key.

In some embodiments, establishing the encrypted connection between the computing device and the remote service involves initiating an asymmetric encryption handshake with the remote service and receiving a pinned certificate from the remote service. Use the pinned certificate involves validating the pinned certificate against a known, trusted, locally-stored copy of the remote service's certificate to ensure that the encrypted connection cannot be intercepted by a man-in-the-middle proxy using a modified certificate authority. The pinned certificate is verified to ensure that the pinned certificate matches trusted local validation information associated with the remote service. The computing device and remote service then exchange information using Diffie-Hellman perfect forward secrecy key establishment techniques to generate the encryption key as a shared symmetric key for the encrypted connection.

In some embodiments, using and verifying the pinned certificate for the encrypted connection ensures an end-to-end encrypted connection between the computing device and the remote service and that no man-in-the-middle proxy can masquerade as the remote service to intercept encrypted communication between the computing device and the remote service.

In some embodiments, generating the shared symmetric key involves saving the shared symmetric key in the memory of the computing device. Harvesting techniques then harvest this saved shared symmetric key from where it was saved in the memory of the computing device.

In some embodiments, after the encrypted connection has been established and acknowledged by the remote service, the computing device encrypts a message to the remote service using the shared symmetric key. This involves executing a functional call to encrypt the message using the shared symmetric key and thus triggers a sub-program that extracts the shared symmetric key from the memory of the computing device.

In some embodiments, the intercepting agent intercepts and stores encrypted traffic that is sent between the application and remote service. The intercepting agent uses the shared symmetric key to decrypt and analyze the encrypted traffic generated by the application without modifying the data streams that are sent between the application and the remote service.

In some embodiments, the intercepting agent tracks and manages the shared symmetric key only for the duration of the encrypted connection, which is substantially shorter than the lifetime of the pinned certificate.

In some embodiments, the intercepting agent, upon detecting an undesired operation or data value in the encrypted traffic, is configured to perform at least one of raising an alert or terminating the application.

In some embodiments, the intercepting agent is a cloud-based security service that executes in a dispatcher virtual machine (VM) executing in a cloud data center. The cloud-based security service receives from an application on the computing device a network request to the remote service, and determines that the remote service is in an untrusted network that is external to and distinct from the cloud data center and an enterprise location in which the application is executing. The cloud-based security service, which includes one or more security service VMs executing in the cloud data center, uses the encryption key to decrypt and analyze the network request. Upon determining in the security service VMs that the network request is permitted, the cloud-based security service allows the network request to continue to travel to the untrusted network.

BRIEF DESCRIPTION OF THE FIGURES

FIG. 10A illustrates exemplary encrypted sessions that are established using unpinned and pinned certificates in accordance with an embodiment.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Cloud-Based Security Challenges

Figure 1:
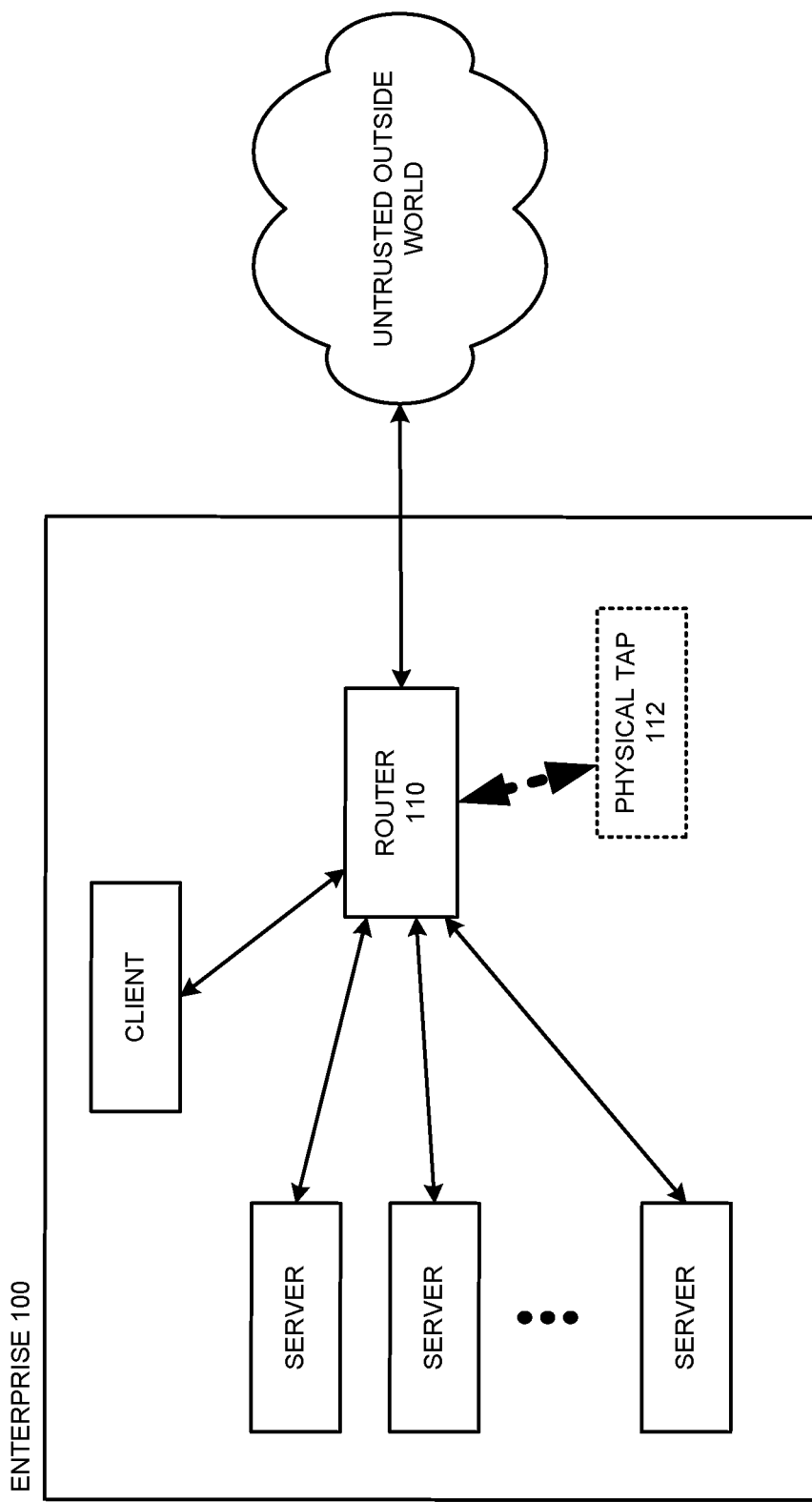
FIG. 1 illustrates an enterprise computing environment.

Traditionally, security practices were able to leverage physical access to computing devices and networking infrastructure to monitor user and application behavior. Most sizeable companies that manage their own enterprise resources and/or data centers could typically employ a security team to analyze network traffic. For instance, as illustrated in FIG. 1 for enterprise 100, such security teams could leverage special physical tap ports on local switches and/or routers (e.g., in FIG. 1, physical tap 112 into router 110) to copy, save, and/or analyze all or a sampled subset of the traffic passing through the device. Security tools could then perform post-processing analysis on such saved traffic to detect anomalies and possible issues.

Recent advances in mobile devices, high-speed networks and cloud computing have led to distributed enterprise environments in which a majority of users work remotely from the company headquarters and access cloud-based applications. Cloud-based computing advances offer substantial computing, storage, and infrastructure management benefits, but unfortunately present challenges to the above-described traditional security practices. For instance, inter- and intra-cloud-service communication is usually encrypted using application and/or network-level encryption techniques, and hence cannot be successfully inspected without the associated decryption keys. While switches and routers were previously middlemen that could potentially intercept data transfers and perform in-line traffic analysis (or manipulation), encrypted traffic dramatically reduces the effectiveness of intercepting traffic. For example, while a middleman device might still be able to determine the destination of the traffic and make copies of the encrypted traffic that is passing through, not being able to actually read the decrypted traffic makes such interceptions substantially less useful. Note that other traditional routing techniques that send traffic through a proxy that attempts to pose as the real target are not effective, because modern encryption techniques further leverage certificates for authentication purposes as well, and prevent the injection of an intermediary in the traffic flow. Thus, while encryption techniques serve an important role in protecting data traffic from external threats, they also can block internal security efforts that seek to ensure that rogue users and/or applications that are inside an enterprise are not performing actions that might negatively impact the enterprise.

Figure 2:
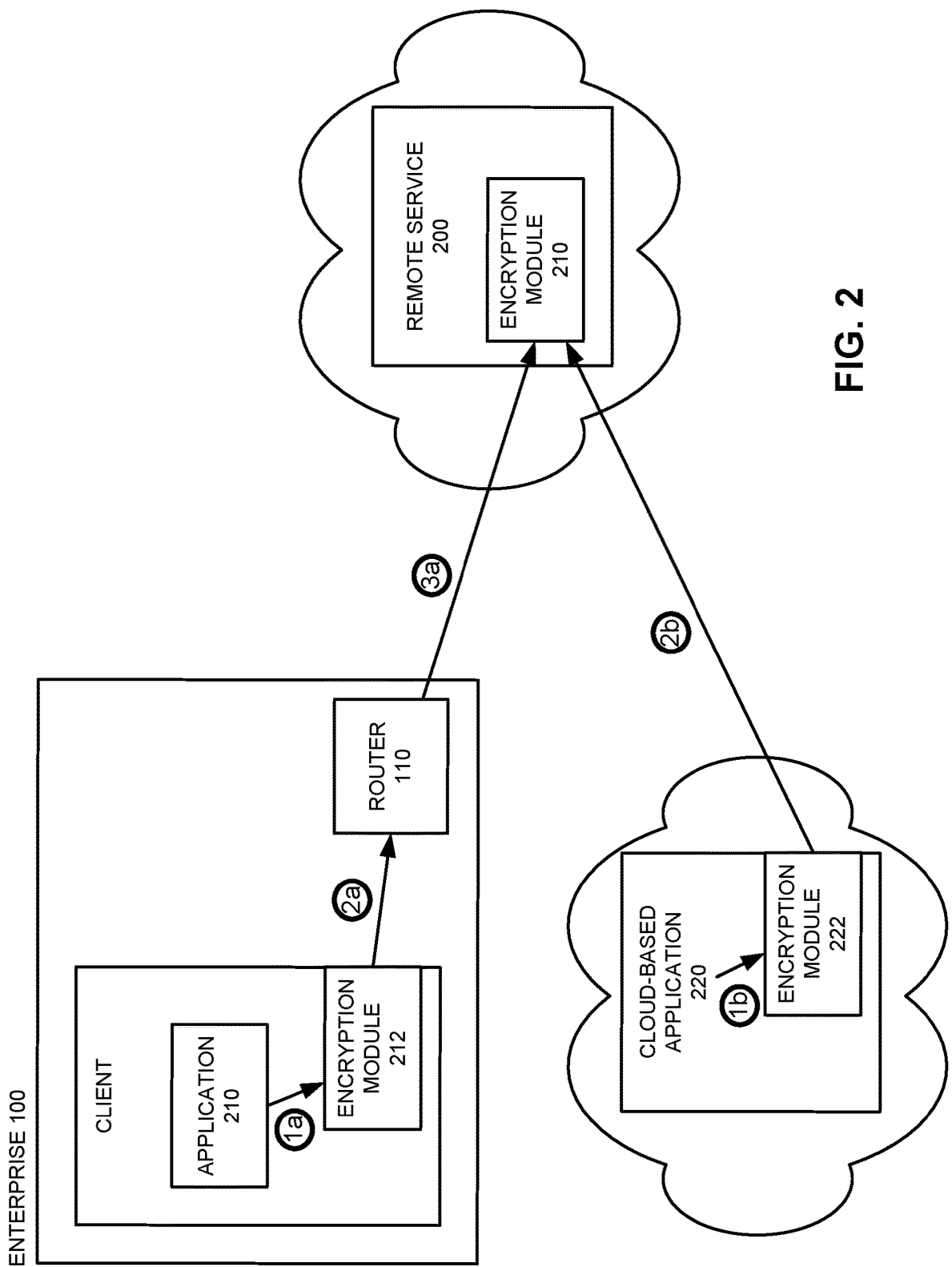
FIG. 2 illustrates the flow of encrypted traffic to a remote cloud-computing service in accordance with an embodiment.

FIG. 2 illustrates the flow of encrypted traffic from various clients to a remote service 200. In one flow, a client application 210 submits a request (e.g., a browser submitting an HTTPS request to a remote website) to an encryption module 212 (operation 1A) that encrypts the request using an encryption key associated with remote service 200. This encrypted request is then forwarded via router 110 (operation 2A) to remote service 200 (operation 3A), where encryption module 210 decrypts the request to enable remote service 200 to service the request. While router 110 can physically intercept the request (e.g., copy the data, or block the request), router 110 cannot decrypt and read the encrypted contents of the request.

Alternatively, in another flow, a cloud-based application 220 executed by enterprise 100 generates a request and uses encryption module 222 to encrypt the request using a key associated with remote service 200 (operation 1B). The encrypted request is sent via non-enterprise networks to remote service 200 (operation 2B), where encryption module 210 decrypts the request for remote service 200. In this scenario, there is no mechanism by which enterprise 100 can physically intercept or block the encrypted request. Furthermore, enterprise 100 cannot physically monitor any aspect of the cloud-computing environments associated with cloud-based application 220 or remote service 200; there is no notion of a "physical tap" that is offered to clients of such remote virtual-computing environments.

Note that even accessing the encryption certificates that are used by valid enterprise-approved applications installed on enterprise-owned client devices in local enterprise 100 can be challenging. For instance, such information and methods may be abstracted away from application developers. For example, an application developer may link to compiled libraries that manage the networking and encryption aspects of sending messages, and never interact with any of the code that manages certificates and performs encryption operations. Hence, many typical applications may not have the capability to expose such information even for valid enterprise purposes. Furthermore, each different network interaction with distinct remote targets may involve a different, distinct key, making it very difficult for an enterprise that has authorized and invoked distributed services to determine and track the specific data and requests that applications send to each remote service. As the number of cloud-based services, requests, and data transfers grow, ensuring that vital enterprise data is protected from leaks or other malicious actions becomes increasingly difficult, which can leave an enterprise vulnerable.

In some embodiments of the present invention, the disclosed techniques enable enterprises to instrument local and cloud-computing environments to access application data that can then be leveraged to decrypt and thus analyze encrypted enterprise network traffic.

Leveraging Instrumentation Techniques to Monitor Encrypted Traffic

Many modern operating systems provide instrumentation capabilities that can be used to enable constrained, validated sub-programs to be executed with kernel permissions. Such instrumentation capabilities allow flexibility and can enable a range of functionalities that otherwise might not be possible if such sub-programs could not be executed with privileged kernel resources; to prevent abuse and system instability, such instrumentation often needs to be specifically allowed for a given user, and the sub-programs need to be verifiably trustable code that meets a set of specific criteria. For instance, the Linux operating system enables instrumentation using programs written in enhanced Berkeley packet filter (EBPF) machine language syntax. EBPF, which originally was invented for the purpose of efficiently filtering and analyzing network traffic, supports a small set of commands that can be compiled into highly efficient, safe, and limited sub-programs. EBPF programs support a small, limited set of instructions, require a reliable finite state machine, and include a number of additional limitations that are enforced by a run-time verifier. EBPF programs are compiled into byte-code that an EBPF virtual machine inside the operating system kernel verifies and executes. For example, the EBPF verifier ensures that EBPF programs are guaranteed to terminate, do not include indefinite, indeterminate, and/or unterminated loops, and are certain to execute safely, securely, and reliably in the kernel. The limitations of the EBPF syntax ensure that the programs are sufficiently simple that they can be reliably verified. Despite these limitations, EBPF programs can be leveraged to provide useful and beneficial functionality. For instance, EBPF programs can include "maps" that are substantially similar to arrays and/or key-value stores, and can be used to communicate with user space or even between EBPF programs.

In some embodiments, kernel instrumentation techniques are leveraged to extract protected information from the memory space allocated to applications executing on a computing device. More specifically, the disclosed techniques can involve: (1) identifying a set of operations and/or events that are associated with desired target data; and (2) using kernel instrumentation support to link targeted sub-programs to those application operations. Subsequently, when an executing application triggers an identified operation, the kernel executes the specified sub-program that has been associated with that operation. The specified sub-program then executes with kernel privileges in the application's address space to find the desired target data, and returns that target data to a specified user process. For instance, a Linux operating system kernel can be configured to trigger a given EBPF program whenever a specific targeted function call in a compiled system library is executed. For example, an EBPF program can be associated with a function call in an encryption library; whenever that function call is executed, the EBPF program is triggered and scans the address space of the triggering application to determine and return the encryption key that is being used to encrypt packets. This encryption key can then be returned to a security application that can subsequently decrypt and analyze the encrypted traffic. Note that while the following examples specifically describe extracting encryption keys, the disclosed instrumentation and extraction techniques are general and can be used to extract any type of target information from executing applications. Such target information may include, but is not limited to, "secrets" (e.g., any data that an application and/or organization may not generally want to be known or easily accessible, such as encryption keys) and information that is otherwise not easily accessible (e.g., due to application and/or programming layers of abstraction). Furthermore, while many of the following examples are described in the context of Linux kernels and EBPF programs, the disclosed techniques are not limited to EBPF, and can be applied to any operating system that provides verifiable instrumentation mechanisms that are granted kernel privileges. For instance, the disclosed techniques may also leverage the DTrace dynamic tracking framework, or any other tracing and/or instrumentation techniques that trace system traps and/or can execute as in-kernel modules (including either driver-based or non-driver-based modules).

Figure 3:
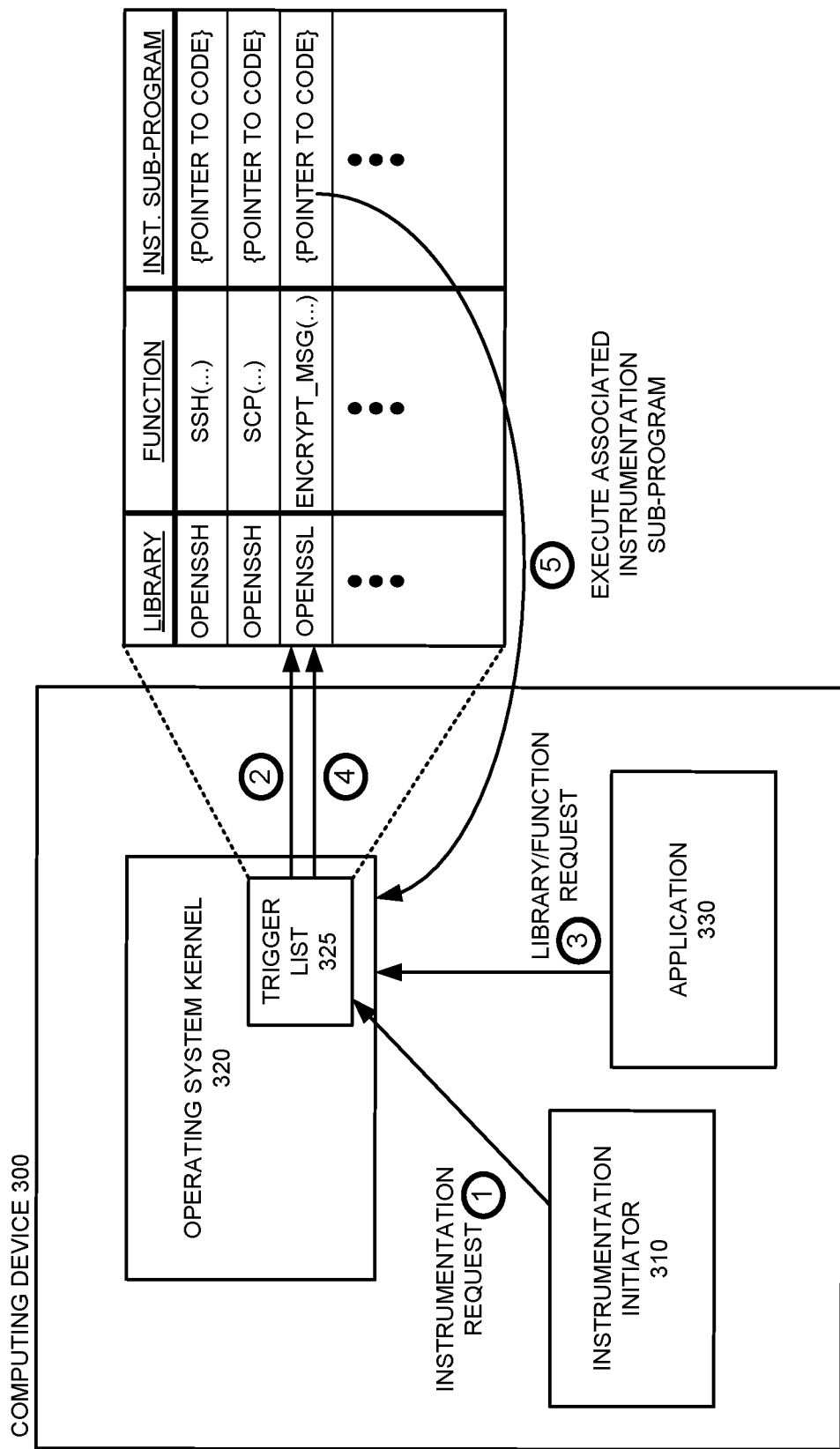
FIG. 3 illustrates a scenario in which instrumentation techniques are leveraged to execute an instrumented sub-program in the memory context of an application in accordance with an embodiment.

FIG. 3 illustrates a scenario in which instrumentation techniques are leveraged to execute an instrumented sub-program in the context of an application 330 executing on a computing device 300 (note that computing device 300 can be a virtual machine executing in a cloud-computing environment). Operating system (OS) kernel 320 maintains a trigger list 325 that tracks the set of events and/or operations that have been associated with instrumented sub-programs. In this example, trigger list 325 includes a set of specified libraries and functions that, when executed, should trigger the execution of their specific instrumented sub-program. During operation, an instrumentation initiator 310 (e.g., a monitoring process that has been granted permission to submit instrumented sub-programs) sends an instrumentation request (operation 1) to OS kernel 320 that requests to associate an attached sub-program with the encrypt_msg( ) function in the OpenSSL library. Upon confirming that instrumentation initiator 310 is permitted to make this submission, OS kernel 320 adds a trigger for this library/function pair to trigger list 325 (operation 2), so that any subsequent calls to this library function (e.g., any application encrypting data using this specific library and function call) will trigger the execution of the specified sub-program. Subsequently, an application 330 executing on computing device 300 (e.g., a web browser executing an HTTPS request) executes a function call to the specified OpenSSL encrypt_msg( ) function (operation 3). The OS kernel 320, in the process of loading the requested library for the function call, (1) checks trigger list 325 and determines that the requested function has an associated instrumentation (operation 4), and (2) executes the associated instrumentation sub-program (operation 5).

Figure 4:
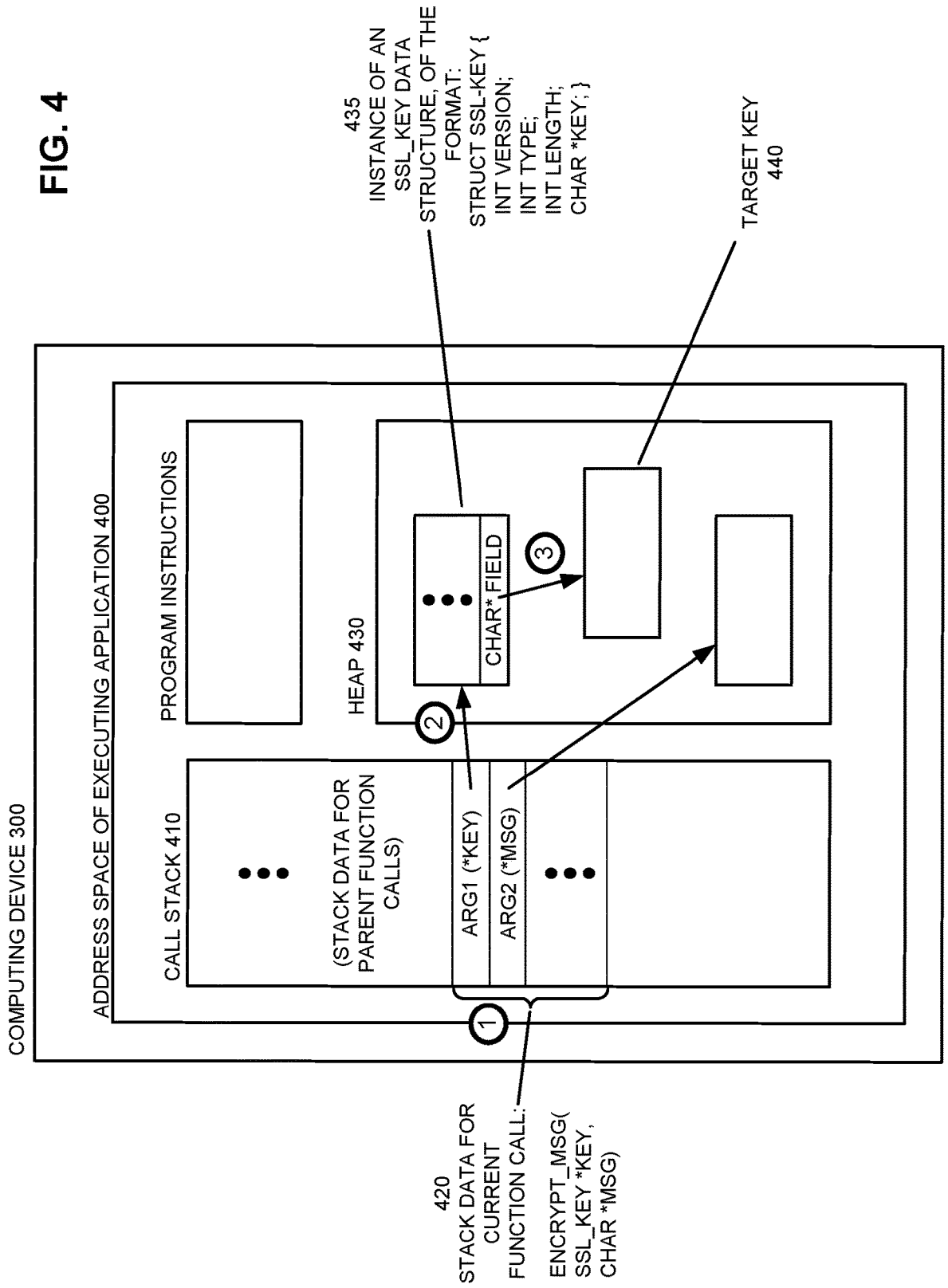
FIG. 4 illustrates further aspects of executing the instrumented sub-program from the scenario of FIG. 3 in accordance with an embodiment.

FIG. 4 illustrates additional aspects of executing the instrumented sub-program for the scenario of FIG. 3 above. As described above, the sub-program executes in the address space of the executing application 400, at a point in time where the triggering function (encrypt_msg( )) has been invoked but has not yet begun to execute. Because the sub-program is jumping into address space 400 at the moment the function call is initiated, the sub-program can leverage pre-determined knowledge about the function call to find the targeted data. For instance, because the parameters on the call stack 410 are known to be the parameters for the triggering function, the sub-program can parse and read these parameters to access and traverse the application 330's data structures. In this example, the stack data for the current function call 420 includes two arguments, specifically a pointer to an instance of an exemplary SSL key data structure 435 and a message string in heap 430 (e.g., in the portion of the address space that is dynamically allocated). The sub-program first reads the address of the target key from call stack 410 (operation 1), and then follows this pointer to access the data structure instance 435 in heap 430 (operation 2). Because the format of the SSL key data structure is known (e.g., either via open library specifications, reverse engineering, or other mechanisms), the sub-program can further read the fields of the data structure instance 435 to determine the version, type, length and memory location of the stored key, and then use this information to access the actual target key 440 from heap 430 (operation 3). The sub-program can then return this value to OS kernel 320, which returns the value to the specified user program and/or target location (not shown). Note that the sub-program does not have its own separate address space and does not benefit from being able to directly include or instantiate instances of the described data structures (unlike the application, which does define pointers to and instantiate the actual data structures)—in contrast, the sub-program leverages knowledge of these data structures to walk through that application's memory space examining the application's actual instantiated data structures. The minimum knowledge of the data structure fields needed to extract the desired information is hard coded into the sub-program to ensure that this extraction can be achieved within the kernel instrumentation constraints.

Extracting an encryption key from a dynamically running system in this manner allows enterprise 300 to inspect its encrypted traffic, both in local and cloud networks (as described in more detail below). Note that the sub-program could also read the unencrypted message from memory as well at the time it is inspecting the application's address space. In some scenarios this may also be beneficial, but given limited sub-program run-time constraints extracting an encryption key that can be used to decrypt a longer time window of encrypted traffic may be more useful than retrieving an initial unencrypted message (of uncertain size).

Note that process memory is usually protected from other processes by the operating system. However, instrumented sub-programs are authorized by the kernel to execute in other applications' address spaces, and hence are granted access. Because these capabilities are explicitly granted by the kernel, the sub-program accesses are not blocked by typical operating system protection mechanisms. In such scenarios, the enterprise has legal access to all of the data and operations that are being performed, but simply does not have other reasonable means of accessing the encrypted data that is being sent and received. While some applications (e.g., web browsers) may include an option to expose sensitive parameters such as encryption keys (e.g., in a debugging mode), this is not common. Furthermore, due to programming abstractions (as mentioned above), application developers may rely on pre-packaged libraries and not even be aware of such low-level details (as encryption keys and encrypted requests). In contrast, the disclosed techniques enable finding information from any application that triggers an instrumented operation or event. Note also that the instrumented sub-program operates independently from any other operations that are concurrently executing (e.g., separately from monitoring applications and/or debugging tools/sessions).

The exemplary scenario of FIG. 4 describes an instrumented sub-program has been generated to leverage knowledge of the function call arguments and data structure layout for the target library and function. In some embodiments, instrumented sub-programs may be configured to leverage knowledge of application and/or library data structures that was derived using a range of means, including inspection of open source libraries and reverse-engineering. For instance, before submitting an instrumentation request, instrumentation initiator 310 may be configured to perform a set of queries to determine the set and versions of libraries that are installed on computing device 300 (e.g., by making calls to the library, scanning library executables to find version strings, or comparing a hash value for the library binary to a list of hash values of known libraries), and then use previously-determined knowledge of these libraries (and the differences between different library versions) to generate and compile a set of instrumented sub-programs that are specifically targeted to the data structures that are known to be used by those libraries. Knowing the exact byte-for-byte layout of the target data structures allows the instrumented sub-programs to quickly and efficiently traverse a complex set of data structure pointers to find and retrieve target data from any type of library and/or executable. While leveraging known data structures facilitates efficient instrumentation, in some instances prior knowledge of data structures may not be available. In such alternate embodiments, instrumentation efforts may involve generating instrumented sub-programs that attempt to explore the address space of the target application on-the-fly in an attempt to still find target data. Depending on the instrumentation limitations of the host operating system and instrumentation syntax (e.g., bounded search range and/or execution time), such efforts may still succeed but have a substantially lower success rate.

Consider several exemplary scenarios in which the above-described techniques can be used to detect and thwart malicious actions. Using such techniques, an enterprise can use an extracted encryption key to decrypt and replay an encrypted SSH session, and determine the remote operations that were executed. For instance, an enterprise security system may be configured to record encrypted traffic that can later be analyzed and/or investigated using collected, extracted keys. Such a security system may also include real-time capabilities that attempt to detect, determine the source of, and potentially attempt to block malicious actions (e.g., a malicious user maliciously executing a remote command-line "rm-rf*" operation via an SSH session to delete vital enterprise files). The disclosed techniques can also be used to detect the encrypted transfer of sensitive files to external locations (e.g., by decrypting scp (secure copy) or Dropbox™ file transfer operations). In general, the disclosed instrumentation techniques can be deployed on enterprise resources (both local and cloud-based), and extracted keys can then be used to monitor, track, and verify any encrypted enterprise traffic. Such techniques can be particularly useful to determine what actions new, potentially untrusted applications (e.g., Facebook™ Messenger) are performing when sending encrypted traffic.

In some embodiments, instrumentation techniques can be applied to any program function. Library functions are particularly good targets, because a library file typically exports a set of function symbols (i.e., a list that references the location of functions in library binary) that allow instrumentation techniques to determine where to break in (if they know the name of the target function); the instrumentation technique can then specify if it wants to break in when entering or exiting the function, and the kernel patches up execution after the instrumented sub-program has executed. Library functions are also practical because they often contain well-known and frequently-used functions that have evolved, been thoroughly tested, and become trusted over time, and hence encompass operations that are likely to be used and not re-implemented by application developers (e.g., cryptography techniques). However, non-library functions can also be instrumented, as long as there is a clear way to determine where to break into execution and how to patch execution back up after the instrumented sub-program has returned. The disclosed instrumentation techniques can be applied to any executable that includes one or more mechanisms that enable determining where to break in and insert an instrumented sub-program (e.g., the executable includes an executable link format (ELF) file with exported function symbols or one or more debug symbols that indicate an entry point, etc.; such mechanisms may also include manually determining and/or guessing a target location—the instrumentation techniques may be configured to use multiple such mechanisms to ensure that instrumentation efforts are successful). In some embodiment, application developers may ensure that instrumentation techniques can be applied by ensuring such executable characteristics and/or inserting specially-crafted program breakpoints into the executable.

In some embodiments, instrumentation techniques are combined with user-level techniques to successfully retrieve secrets. For instance, consider the retrieval of a target data value/secret that is contained in a linked list of data structures. Due to limited sub-program functionality (e.g., because many instrumentation frameworks prohibit loops), a sub-program may be unable to simply jump through the linked list until it finds the target data value. Instead, an instrumented sub-program is configured to return the address of the linked list, along with the parameters needed to determine the target data value, to a user space program. This user space program (which may need to be granted sufficient privileges to read other processes' memory space) can then jump through the linked list, starting at the address provided by the instrumented sub-program, to determine the target data value; note that the user space program may need to be configured to know or determine the format of the data structures that comprise the linked list. Hence, instrumented sub-programs can be executed in conjunction with user-level programs to add a level of redirection that enables additional capabilities that cannot be provided by instrumentation techniques alone.

Figure 6:
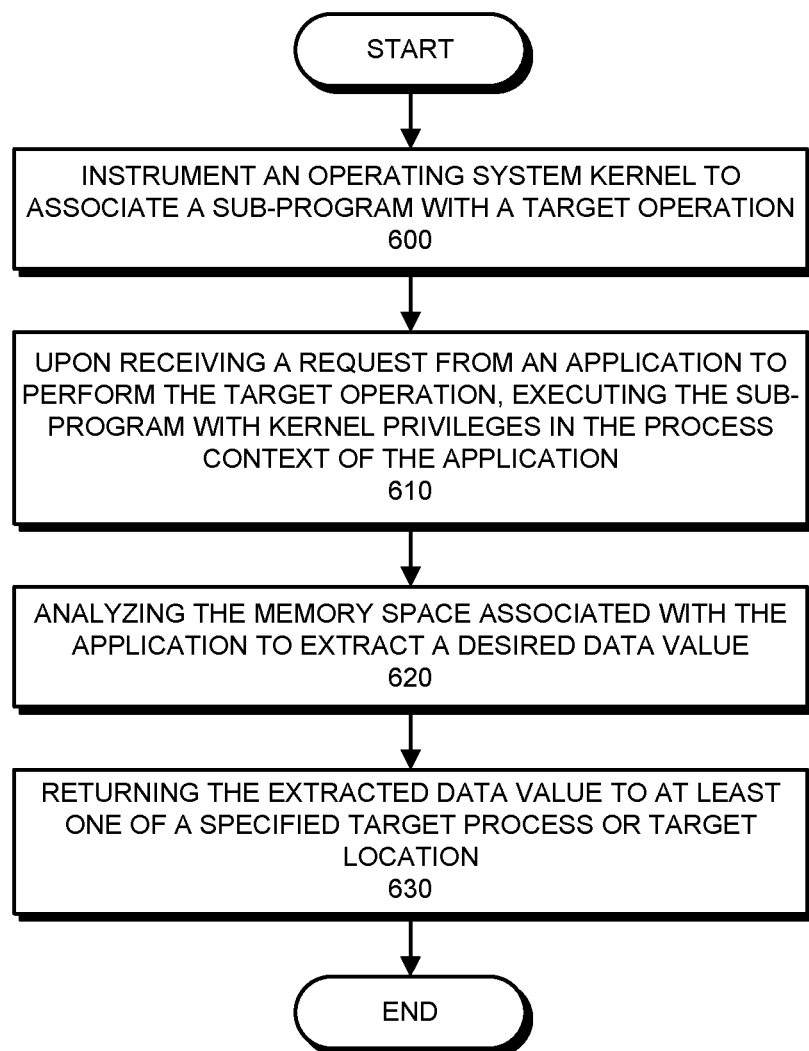
FIG. 6 presents a flow chart that illustrates the process of leveraging instrumentation capabilities to enable cloud-based monitoring services in accordance with an embodiment.

FIG. 6 presents a flow chart that illustrates the process of leveraging instrumentation capabilities to enable cloud-based monitoring services. During operation, an operating system kernel is instrumented to associate a sub-program with a target operation (operation 600). Upon receiving a request from an application to perform the target operation, the operating system kernel executes the sub-program with kernel privileges in the address space of the application (operation 610); the sub-program analyzes the memory space associated with the application to extract a desired data value (operation 620). This extracted data value is returned to at least one of a specified target process or target location (operation 630).

Note that while many of the preceding and following examples apply the disclosed techniques in the context of cloud-based computing environments and/or clients accessing remote services, the disclosed techniques can be applied to any environment (e.g., local, cloud, firmware, etc.) in which instrumentation techniques can be applied. For example, such techniques could also be applied to the client in enterprise 100 in FIG. 2. More specifically, instrumentation techniques can be used to determine and retrieve secrets on a computing device whether or not that computing device accesses remote services or is located in (or contacting) a cloud-based computing environment.

In summary, kernel instrumentation capabilities can be leveraged by instrumented sub-programs that are triggered by specified function calls. These instrumented sub-programs leverage specific knowledge to analyze and traverse the address space of triggering applications to extract target data. A system built upon such techniques can decrypt, analyze, and stop potentially undesired operations that could otherwise not be detected without the extracted target data.

Deploying Instrumentation Techniques

In some embodiments, instrumentation management capabilities are integrated into an enterprise agent module and/or product that can be deployed and/or instantiated both on local clients as well as in cloud-computing environments. A deployed enterprise agent copies network traffic (both encrypted and unencrypted), extracts encryption keys and any other specified data from applications using the above-described instrumentation techniques, and forwards the collected data as specified by an enterprise security team.

In some embodiments, the enterprise agent is executed using one or more docker containers in a flexible, efficient docker-based dispatcher architecture. In traditional cloud-computing architectures every distinct piece of functionality would need to be instantiated in a separate virtual machine (VM), which, depending on the complexity of the desired traffic processing architecture, can substantially increase the overall system cost. In contrast, docker containers (or "dockers") provide a lighter-weight solution that facilitates automating the deployment of multiple applications (sometimes referred to as "microservices") inside distinct software containers that all operate within a single virtual machine and can communicate with each other using standard networking protocols (e.g., via Linux namespaces and IP-layer network protocols). Allowing independent containers to run within a single virtual machine avoids the cost and overhead of starting and maintaining multiple virtual machines. Note that such docker containers run in isolation and leverage operating system kernel resources to communicate; containers can be provisioned and provided with an abstraction of their own process space and interfaces, and can be constrained to use a specific defined amount of resources (e.g., CPU, memory, and network or other I/O bandwidth). An end user can deploy an enterprise agent using docker containers by: (1) instantiating the enterprise agent docker container in a target cloud-computing environment; (2) granting the enterprise agent docker container sufficient permissions to perform instrumentation; (3) specifying the set of operations and/or events that should be instrumented; and then (4) executing the configured enterprise agent docker container. Docker containers provide a simpler installation process than many other options (e.g., Linux RPMs).

The previously-described instrumentation techniques often leverage specific knowledge of operating systems, applications, libraries, function calls, data structures and other parameters. In some embodiments, an instrumentation configuration service (ICS) serves as a central repository for such knowledge. Enterprise agents can be configured to determine the parameters for the local environment they are executing in (e.g., library versions, etc.) and then contact the ICS to request configuration parameters that specifically match their local environment. In some embodiments the ICS may generate, compile, and send instrumented sub-programs to requesting enterprise agents, while in other embodiments the ICS may instead just send information that can be used by the enterprise agent to generate its own instrumented sub-programs. Gathering instrumentation knowledge in a shared repository facilitates providing updates to enterprise agents as new versions of applications and libraries are released over time; after the changed data structures for a new library release have been added to the shared repository, enterprise agents executing in environments that include the new library release can adapt their instrumented sub-programs automatically. Note that enterprise agents encountering new (or unknown) versions of libraries and/or function calls may also be configured to test whether the instrumentation sub-programs used for previous library versions still work for the new version, and if so, report this information back to the ICS. For example, in the context of extracting an encryption key, an enterprise agent can test extracted key data to confirm that the encrypted packets can still be decrypted, thereby determining whether the extraction was successful or not.

Figure 5:
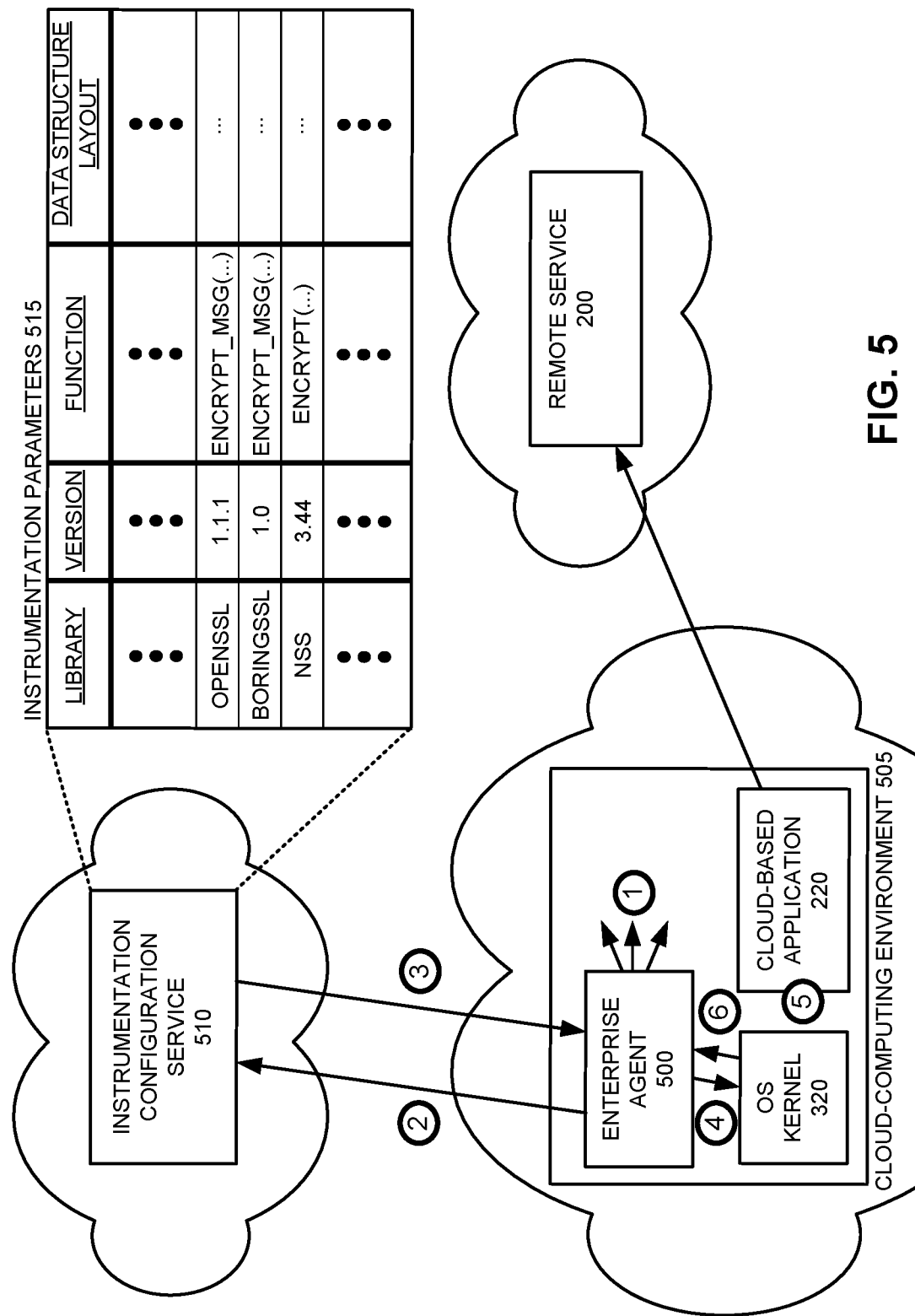
FIG. 5 illustrates an exemplary scenario in which an enterprise agent leverages an instrumentation configuration service in accordance with an embodiment.

FIG. 5 illustrates an exemplary scenario in which an enterprise agent 500 leverages an instrumentation configuration service 510. Enterprise agent 500 is instantiated as a docker container in cloud-computing environment 505 with the permissions needed to submit instrumentation requests. Enterprise agent 500 first analyzes the infrastructure available in cloud-computing environment 505 (operation 1). For instance, enterprise agent 500 may determine that the host operating system is Linux and that there are specific versions of three encryption libraries that are installed in cloud-computing environment 505 (e.g., OpenSSL, Netscape Secure Services, and Boring SSL, each of which has its own unique structures and function calls). Enterprise agent 500 sends this collected information to ICS 510 (operation 2), which tracks instrumentation parameters 515 for a range of libraries, function calls, and events. ICS 510 determines, compiles, and sends a set of customized instrumented instructions for the specified library versions back to enterprise agent 500 (operation 3). For example, these instrumentation instructions may include: (1) a specific list of library and application function calls that should be added to the trigger list; (2) a set of instrumented sub-programs for each of those function calls; and (3) receiver handler code for each function call that indicates how the enterprise agent 500 should handle the extracted data that is returned by the corresponding sub-program. Enterprise agent 500 submits these instrumented sub-programs to the local OS kernel 320 (e.g., a Linux OS kernel executing in a virtual machine, or a hypervisor), which updates its trigger list accordingly (operation 4). Subsequently, whenever cloud-based application 220 triggers one of the instrumented function calls (operation 5), OS kernel 320 verifies and executes the triggered sub-program in the address space of cloud-based application 220. The instrumented sub-program extracts the encryption key and passes the extracted encryption key back to the enterprise agent 500 (operation 6). Enterprise agent 500 also captures any encrypted packets that are being sent to remote server 200, and can use the extracted encryption key to decrypt the encrypted traffic and, if desired, forward the decrypted traffic to an enterprise security team and/or storage system (not shown).

In some embodiments, executing instrumentation techniques in a container-based computing environment can involve additional techniques and/or configuration. For instance, the disclosed techniques can be used to perform instrumentation in a container-orchestration system such as Kubernetes, which facilitates automating application deployment, scaling, and management. Such container-based computing environments provide a "cloud-like" platform on whatever computing hardware that they execute upon. Other examples of container orchestration systems include Docker Swarm, Apache Mesos, and Amazon ECS. The disclosed techniques can be applied in any container-orchestration system executing either on virtual machines or physical hardware, and in either a local or cloud-based environment.

Clients executing in such a container-based environment typically leverage docker containers that execute as multi-tasking microservices within a dispatcher virtual machine (VM). As mentioned above, docker containers execute in isolation of each other but can use operating system kernel resources to communicate with each other; each docker container is provided with an abstraction of its own process space and interfaces. In such an environment, docker images may be loaded and deleted frequently, and docker containers may be instantiated and destroyed frequently as well. Each container uses its own separate filesystem, and hence each container's different libraries and binaries would need to be instrumented separately. A service managing instrumentation (e.g., the enterprise agent described above) may be configured to monitor several sets of events to ensure that it receives notification whenever something that is being monitored for instrumentation purposes changes. For instance, the enterprise agent may monitor a "standard docker events channel" that publishes docker container events, and ensure that instrumentation triggers are configured and loaded properly for each new docker container that is being created/instantiated; i.e., the enterprise agent detects whenever a new docker container is instantiated, determines the set of files and/or libraries that can be instrumented for that new docker container, and sets up a corresponding set of triggers. This ensures that every new process that is started in a new docker container is found and instrumented, even if it has just been loaded and instantiated.

Note that in some embodiments, a kernel instrumentation system might not directly monitor the creation and removal of docker containers, and the enterprise agent may also be configured to track the deallocation of docker containers and, in response, remove instrumentation triggers that are no longer being references by existing docker containers. Keeping the set of instrumented triggers to a minimal, valid subset facilitates improving performance and reducing the amount of memory being consumed by the instrumentation system.

In some embodiments, instrumentation techniques are executed by the kernel based on targeted files and offsets (e.g., triggers are configured such that "when a given offset of a specific file is executed, intercept and execute this instrumented sub-program"). However, in a docker-based environment, the kernel may operate in a context of host file system files that are in a different address space from the files found in the container filesystems (because each docker container has its own separate filesystem space with separate copies of those files). Hence, a call to a library in the docker container (e.g., for the library/user/lib/libssl.so.1.1) would result in a system call to the version of the library in the kernel filesystem (i.e. the copy in the host filesystem, not the docker filesystem). So, instrumenting this file involves finding the file's full path in the host (kernel) filesystem, and instrumenting that file instead of the version of the file that is inside the container. Note that this file (that is being instrumented) in the host filesystem needs to be available (e.g., accessible with the correct permissions) to the process that is instrumenting the file (e.g., the enterprise agent process).

In practice, an application configuring instrumentation in a container-based environment cannot instrument files from within a container, but instead needs a mechanism that allows temporarily escaping the container and performing a system call in the context of the host filesystem to configure instrumentations. In some embodiments, this may involve mounting the host file system into the container, and then executing a "chroot" operation into the host filesystem that gives the process executing in the container the appearance of running within the host operation system; e.g., the instrumentation monitoring service "escapes" the filesystem of the container and operates as if it were installed in the host operating system. To achieve this, the container executing the instrumentation monitoring service must be given a set of permissions that allow the chroot operation.

In some embodiments, a container-based computing environment may also be configured and/or instantiated in a way that ensures that one, and only one, enterprise agent (sometimes also referred to as simply an "agent" or a "sensor") is invoked to execute on the host device (e.g., only one docker container in the computing environment executes the enterprise agent, thereby ensuring that multiple agent instances do not conflict with each other). For instance, in the Kubernetes environment, this can be achieved by executing the enterprise agent as a "DaemonSet."

Harvesting Target Data Using Scanning Techniques

There are some environments in which instrumentation techniques may not always be able to find and/or access a desired data value. For instance, some environments may not provide the permissions or triggering infrastructure that are needed to execute instrumented sub-programs, or some executables may be compiled and linked in a way that does not make it possible to set a trigger hook into a specific function call. In other examples, a newly-released library may also not have been sufficiently analyzed for instrumentation purposes, and/or an ICS may not have been updated yet to support a most recent library, executable, and/or operating system.

In some embodiments, targeted scanning techniques can also be used to harvest target data from memory. Such techniques can leverage knowledge of an operating system and/or application practices to narrow down the portion of memory that needs to be scanned and to identify target characteristics to search for. For instance, in the Windows environment, the encryption keys for a TLS (transport layer security) connection may be detected by either: (1) hooking into the application initiating the connection, and upon detecting a TLS connection completion, inserting instrumented code that extracts the keys; or (2) tracking the set of TLS connections and the applications that are managing the keys for these operations, and then scanning the memory associated with the key-managing applications to identify and extract the encryption key for the target TLS connection. For example, the second option may involve scanning the memory of applications associated with the Microsoft® Secure Channel (Schannel) applications, such as lsass.exe, to search for a match on a specific string that is typically followed by an encryption key. A key extraction system can scan the targeted memory region, identifying all of the stored encryption key, and then test these keys to identify which specific encryption key corresponds decrypts which specific TLS connection (e.g., by attempting decryption using each specific encryption key to determine if the decrypted output is intelligible/identifiable).

Note that in many computing environments most applications rely on a small set of trusted service applications to manage their encryption operations and encryption keys—as a result, the targeted portions of memory that need to be searched are often limited, making such scans effective in reasonable timeframes. For instance, in the Windows environment, the encryption management tools may consist primarily of built-in Microsoft® tools (lsass.exe) and Google Chrome®; key harvesting efforts focused on such a small set of targets are tractable in real-time.

Monitoring Communication Encrypted Via Pinned Certificates

In some embodiments, instrumentation techniques can facilitate the performance and monitoring capabilities of firewalls, MITM (man-in-the-middle) proxies, and other intermediate computing devices (or entities). Furthermore, instrumentation techniques can be used to monitor connections that are encrypted using pinned certificates.

In a typical (unpinned) asymmetric certificate interaction, a client initiates a handshake with a server, during which it receives a certificate and public key. The client verifies the certificate and/or public key, and the client and server (remote service) then set up a shared symmetric key. For instance, using Diffie-Hellman (DH) perfect forward secrecy (PFS) key establishment techniques, the client and server can exchange public data to set up a shared symmetric key, and subsequent data flows between the client and server are then encrypted using this shared symmetric key. Asymmetric encryption operations are typically one or more orders of magnitude more computationally expensive than symmetric encryption operations (e.g., an order of magnitude more on client, and multiple orders of magnitude on server), so performing an initial asymmetric handshake to establish a less computationally-expensive symmetrically-encrypted connection improves overall performance for subsequent encrypted communication.

Note that the above-described key-harvesting techniques have several opportunities to harvest keys: (1) at the time of the DHS/PFS handshake; and (2) during the timeframe at which the client and server are communicating using an encryption key. Intermediate agents cannot decrypt the encrypted connection without the shared symmetric key, and PFS guarantees ensure that recorded encrypted data cannot be decrypted after the encrypted connection has ended and the client and server have discarded the shared symmetric key, even if the client or servers' key pairs or certificates are compromised.

Note also that when encryption is performed using unpinned certificates, the client may perform some basic validation on the certificate that it receives from the server, but does not verify that the certificate matches any known certificate. For instance, the client might only check to see if the certificate's root came from a trusted certificate authority and that the server specified in the certificate matches the server that the client is attempting to connect to. In some configurations, this simple checks facilitate intercepting and listening in on such encrypted network traffic.

FIG. 10A illustrates exemplary encrypted sessions that are established using unpinned and pinned certificates. In FIG. 10A, a set of unpinned certificate accesses 1010 initiated by client 1000 can be intercepted in an intermediate computing environment 1050 by an intercepting agent 1055 (e.g., a man-in-the-middle (MITM) proxy or firewall co-located with a gateway, enterprise router, or cloud-based security stack that client 1000's traffic is routed through) that leverages an associated (or compromised) trusted certificate authority. For instance, if browser 1012 and/or application 1014 attempt to establish an encrypted session with a remote service (e.g., https://news.com), intercepting agent 1055 could intercept the connection attempt and send back to client 1000 a crafted substitute certificate that it has the private key for; if client 1000 trusts the associated certificate authority, it accepts this substitute certificate and sets up an encrypted channel with intercepting agent 1050 (instead of the remote service). Intercepting agent 1055 then establishes its own distinct encrypted connection to the remote service, and serves as an intermediary between client 1000 and the remote service; in this configuration all of the traffic between client 1000 and the remote service passes through intercepting agent 1055, which allows intercepting agent 1055 to inspect, analyze, and modify client-server communications. Performing monitoring in this configuration only involves leveraging a trusted certificate authority, and does not involve breaking/cracking any encryption techniques.

Note that executing the above-described interception techniques can involve substantial additional compute resources and overhead. As described previously, asymmetric encryption techniques consume substantially more compute cycles than symmetric encryption techniques. Intercepted encryption requires two full sets of asymmetric handshake operations, first between the client and the intercepting agent and then also between the intercepting agent and the remote service. Even after the asymmetric handshaking has been completed, each leg of communication is also encrypted using separate, distinct symmetric keys, doubling the number of encryption and decryption operations that are needed to transfer data from the client to the remote service (and vice versa). Furthermore, the intercepting agent also has to mimic the characteristics of the remote service's certificate (e.g., presenting a certificate of the same type and age, determining changes due to the extension of expiring certificates, etc.) to match the certificate of remote services as closely as possible. Tracking and managing certificates and their associated data for all of the intercepted traffic of multiple clients can involve complex and ongoing certificate management overhead. Hence, encrypted communication intercepted using such techniques may cause substantial communication delay, require substantial additional computing complexity for certificate management, and require an intercepting agent to be provisioned with substantial computing resources to perform all of the encryption operations to intercept the encrypted traffic flows of the targeted clients.

The above-described interception techniques may be deemed unfavorable or risky by some application and remote service providers, for instance because they violate end-to-end security guarantees or inject additional delay into the communication flow (e.g., for real-time gaming applications). Certificate pinning techniques can be used to block interception techniques; certificate pinning forces clients to validate a server's certificate against a known copy of the server certificate. For instance, a client may validate against the entire certificate or the server's public key, or a fingerprint (hashed version) of them. A connection is only made if the client and server side certificates match; otherwise, the client rejects the connection. Note that this involves somehow acquiring a fingerprint and/or copy of the server credentials on the client (e.g., pre-loaded into the application, during an initial trusted client/server connection that is authenticated in some additional manner, or via some other trusted channel).

In FIG. 10A, applications that incorporate pinned certificate accesses 1020 include a file service 1022 and application 1024. Pinned certificate accesses 1020 validate the certificates of remote sites to ensure that only the actual certificates associated with the specified target servers are used for encryption purposes. As a result, intercepting agent 1055 can no longer decrypt and analyze the underlying traffic, but instead can only either pass or block the encrypted traffic, and can only attempt to perform analysis upon encrypted traffic to the best of its ability (e.g., perhaps determine the presence and quantity of encrypted traffic, depending on whether additional countermeasures are used). While certificate pinning techniques can block existing interception techniques and thus prevent monitoring and analysis of encrypted network traffic, embodiments of the above-disclosed instrumentation techniques facilitate decrypting and monitoring encrypted communication that was established using pinned certificates.

In some embodiments, key harvesting techniques are used to extract encryption keys that have been established using pinned certificates. These extracted encryption keys are then used to intercept and decrypt the encrypted communication without modifying the encrypted traffic or injecting any additional delay into the communication (e.g., without needing to perform intermediate decryption and re-encryption at an intercepting agent). For instance, key harvesting can be used both to extract asymmetric and symmetric key information as needed, and then supply those extracted keys to an intercepting agent that uses them to decrypt, monitor, and analyze the contents of an encrypted traffic stream.

Figure 10B:
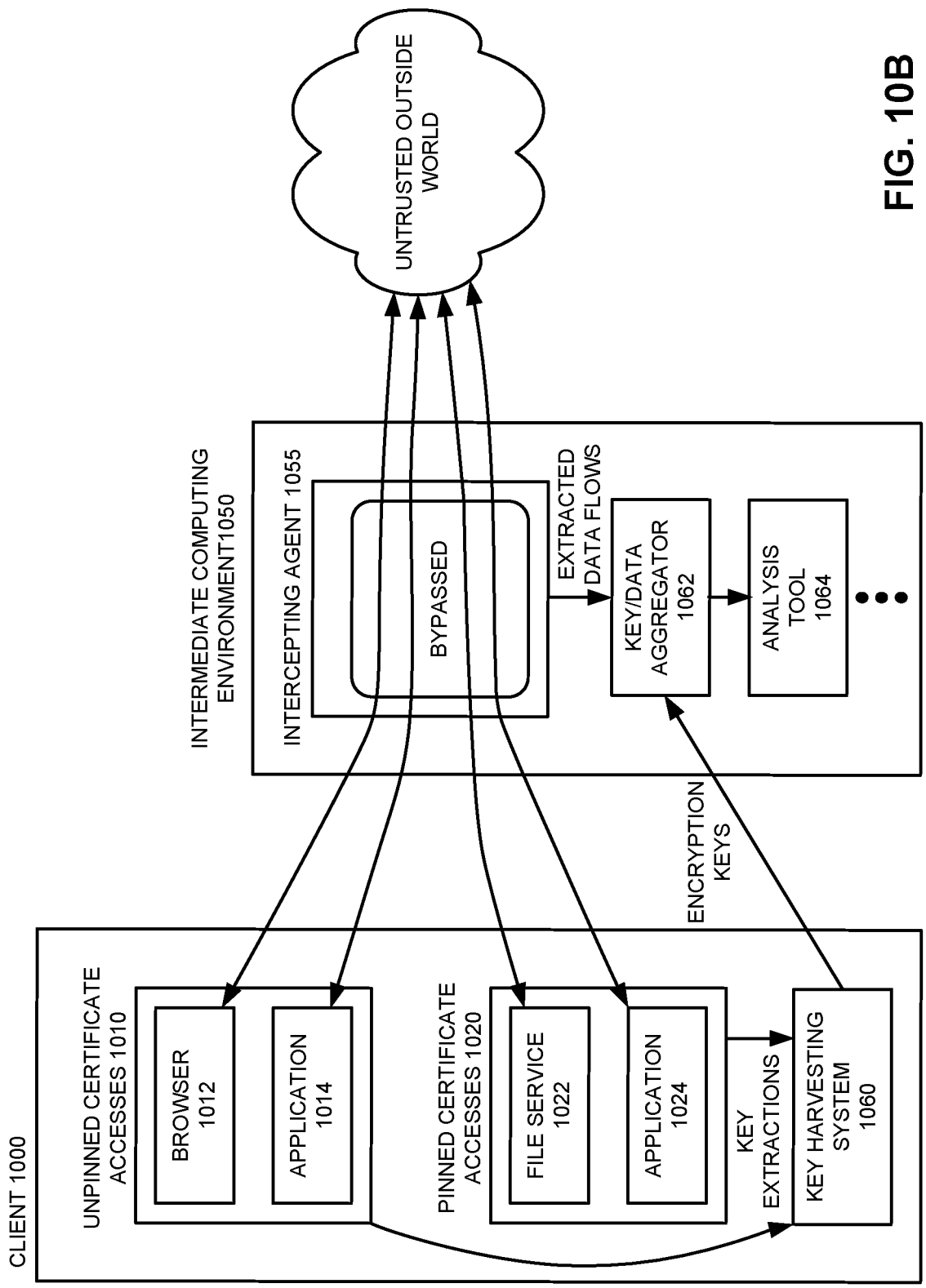
FIG. 10B illustrates how instrumentation techniques can be leveraged to monitor exemplary encrypted sessions that are established using unpinned and pinned certificates in accordance with an embodiment.

FIG. 10B illustrates an exemplary scenario in which a key harvesting system 1060 (as described above) extracts keys from a set of applications that perform encryption using both pinned 1020 and unpinned 1010 certificates. After keys have been extracted using the disclosed key harvesting techniques, they can be forwarded to a key/data aggregator 1062 that extracts and decrypts encrypted data flows. For instance, in the context of FIG. 10B, all of the encrypted traffic may be configured to flow through intermediate computing environment 1050, where it is extracted (without delay or modification) by intercepting agent 1055 (which may be a MI™ proxy, firewall, gateway/router, or some other compute entity). The extracted (encrypted) data flows can then be decrypted by key/data aggregator 1062, which may in turn pass the decrypted data to one or more analysis tools 1064 that perform additional analysis upon the data stream.

Such analysis tools may include any inline tools that typically operate on MITM proxies or firewalls, for instance including a network protocol analyzer that performs deep inspection upon captured network data and security tools that ensure that valuable enterprise data is not being leaked via encrypted channels.

In some embodiments, key harvesting techniques are leveraged to extract a symmetric key that is received after the asymmetric handshaking has been completed. For instance, instrumentation techniques may target functions and/or memory regions that are associated with receiving, storing, and/or using such symmetric keys; after the initial asymmetric handshaking, a client application triggers a function call to encrypt data using the new shared symmetric key, which in turn triggers an instrumented sub-program that extracts the symmetric key and forwards it to a key/data aggregator. Alternatively, the key harvesting techniques may be configured to target functions and/or applications that handle asymmetric key operations to extract an asymmetric key or a symmetric key as well. For example, an instrumented sub-program may be set to trigger on a call to an encryption function that is using a shared secret to create a shared symmetric key to extract the shared symmetric key. In some scenarios, extracted asymmetric key information may also be sent to a key/data aggregator decrypt traffic flows between a client and a remote service.

Note that, as illustrated in FIG. 10B, performing key extraction using key harvesting techniques both: (1) enables the monitoring of encrypted data streams that were established using pinned certificates; and (2) eliminates any need to use the above-described interception techniques for unpinned certificates that leverage trusted certificate authorities, thereby reducing any performance impacts associated with multiple chained asymmetric handshakes and multiple symmetric encryptions. Instead, encrypted client traffic flows pass through the intercepting agent normally, unmodified, thereby reducing communication delays and overhead. Note also that while the key/data aggregator needs to track the set of symmetric keys that are being used for traffic flows, these are typically fairly short-lived (e.g., re-established for each subsequent connection to any given remote service, with much shorter lifetimes than certificates), which substantially reduces tracking overhead.

Figure 11:
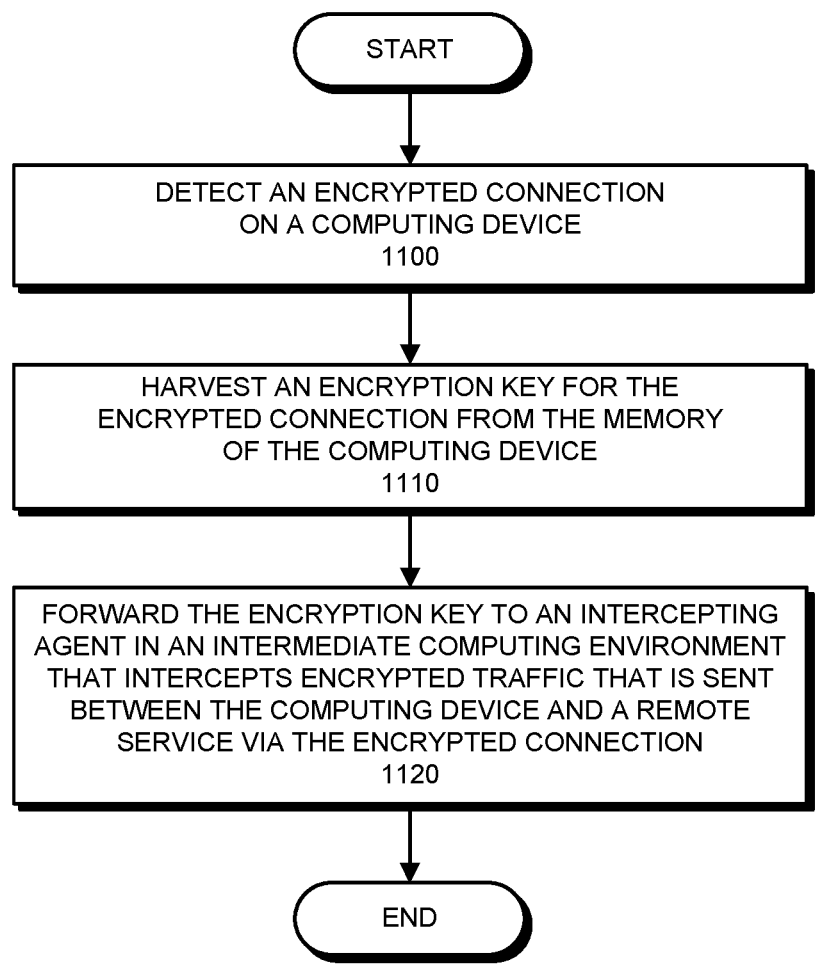
FIG. 11 presents a flow chart that illustrates the process of extracting encryption keys to enable monitoring services in accordance with an embodiment.

FIG. 11 presents a flow chart that illustrates the process of extracting encryption keys to enable monitoring services. During operation, an encrypted connection is detected on a computing device (operation 1100). A monitoring service harvests an encryption key for this encrypted connection from the memory of a computing device (operation 1110) and then forwards the encryption key to an intercepting agent in an intermediate computing environment that intercepts encrypted traffic that is sent between the computing device and a remote service via the encrypted connection (operation 1120). Such techniques enable the monitoring of encrypted enterprise traffic and can be used to analyze and ensure the security of enterprise traffic.

In summary, the disclosed techniques support both monitoring encrypted communication channels that have been established using pinned certificates as well as bypassing the need to intercept and modify asymmetric encryption techniques, leverage certificate authorities, and perform complex certificate management for encrypted communication channels that use unpinned certificates. Such techniques can speed up MITM proxy, firewall, and other intermediate agent operations significantly without modifying the traffic between a monitored client and a remote service. Furthermore, the disclosed techniques can reduce the amount and cost of computing resources (including expensive, specialized encryption/decryption hardware) that are frequently needed to perform interception-based traffic monitoring.

Leveraging Harvested Encryption Keys for Cloud-Based Security Services

Figure 9A:
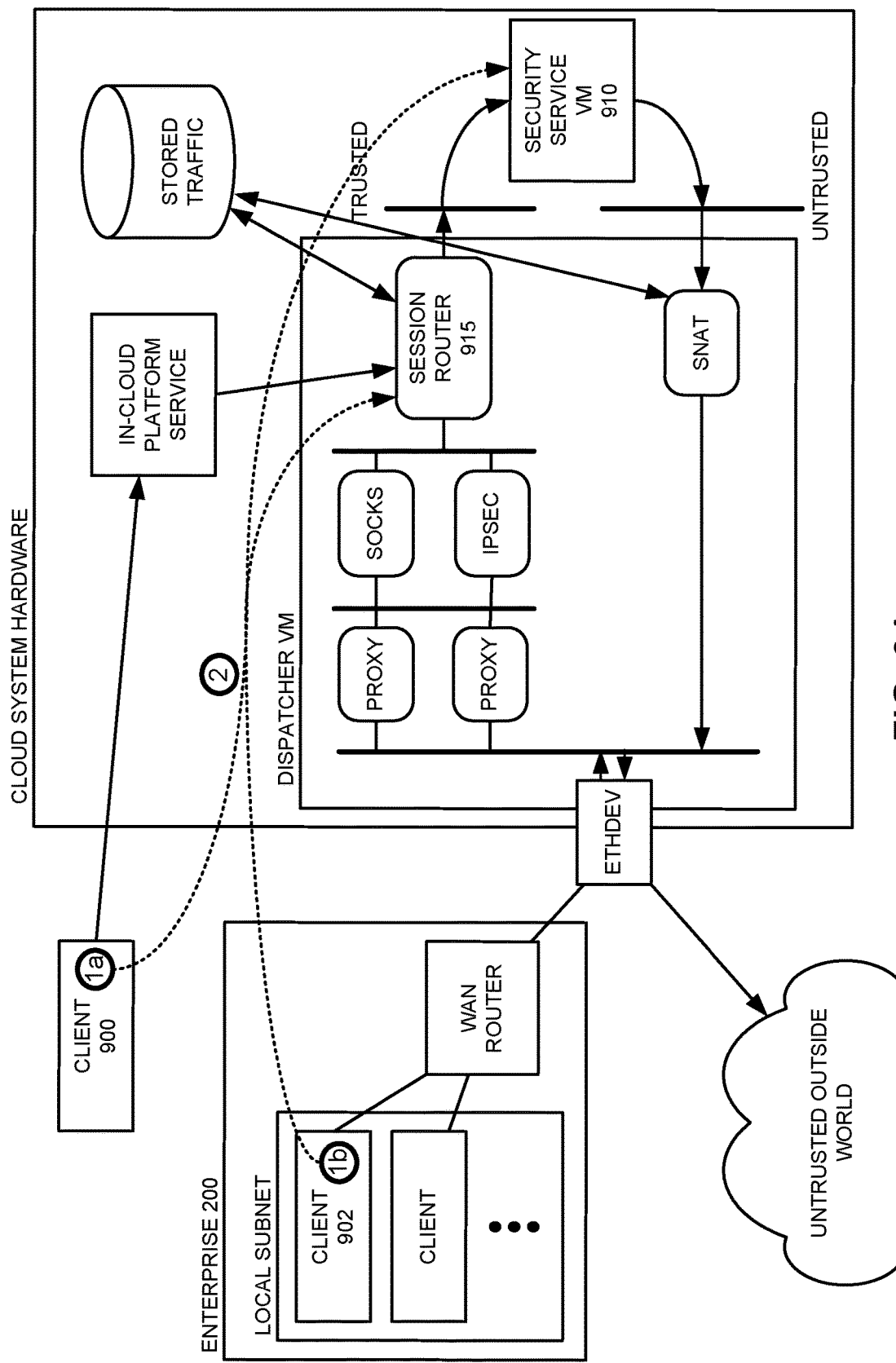
FIG. 9A illustrates an exemplary scenario in which an encryption key is forwarded to a cloud-based security system in accordance with an embodiment.

In some embodiments, the above-disclosed techniques can be applied in conjunction with a scalable cloud-based security system that instantiates security services as cloud compute services using a flexible, efficient docker-based dispatcher architecture. All enterprise traffic flows (both from within as well as from clients that are external to the enterprise are routed through a customized cloud-based security stack, as described in more detail in pending U.S. patent application Ser. No. 15/842,848, filed 14 Dec. 2017 by inventors Randy Yen-pang Chou and Greig W. Bannister, entitled "Optimizing Data Transfer Costs for Cloud-Based Security Services", which is incorporated by reference in its entirety. A cloud-based security system allows security solutions to be rapidly reconfigured and provisioned as needed to resolve evolving threats. Normally security tools are constrained to analyzing encrypted traffic, which limits the amount of analysis that can be performed because the actual data being sent cannot be analyzed. However, a client can harvest and forward the encryption keys to the cloud-based security system (as well as to a local security system), as illustrated in FIG. 9A, to enable richer and more complete analysis and thus improved enterprise security. More specifically, in FIG. 9A an enterprise agent (not shown) on clients 900-902 can leverage key harvesting techniques to determine encryption keys (operations 1a-1b) that are then forwarded (operation 2) to a security service virtual machine 910 (or a session router 915 that routes traffic flows to security service virtual machine 910) to enable more thorough traffic analysis based on traffic flow data contents.

In some embodiments, encryption keys that are retrieved using key harvesting techniques can be used to synthesize an unencrypted traffic session. A network service may be configured to receive both plaintext and encrypted requests; a plaintext request would include all of the information that was sent and received and could easily be analyzed by a cloud-based security service, but an encrypted session would be unintelligible to the same security service because all of the data would be encrypted. If the network service sent a virus in response to the plaintext request, the virus could be detected by a security service, but such detection would not be possible for an encrypted request. However, a security service provided with the encryption key could verify the validity/safety of a response by decrypting the encrypted request and constructing ("synthesizing") a new, analogous unencrypted request, presenting that request to the network service, and analyzing the unencrypted response to ensure that it is safe/correct. Hence, synthesizing involves presenting information from inside an encrypted session as if it had been requested in an unencrypted manner. If the response is deemed safe/valid, the encrypted request can be allowed to proceed as normal; if there are any issues, the encrypted traffic can be halted or dropped. Note that in some scenarios the security service may need to be configured with sufficient knowledge to detect and/or adjust stateful requests to ensure that the result of the second (encrypted) request is not changed and/or contaminated by the existence of a preceding (unencrypted) request.

Figure 9B:
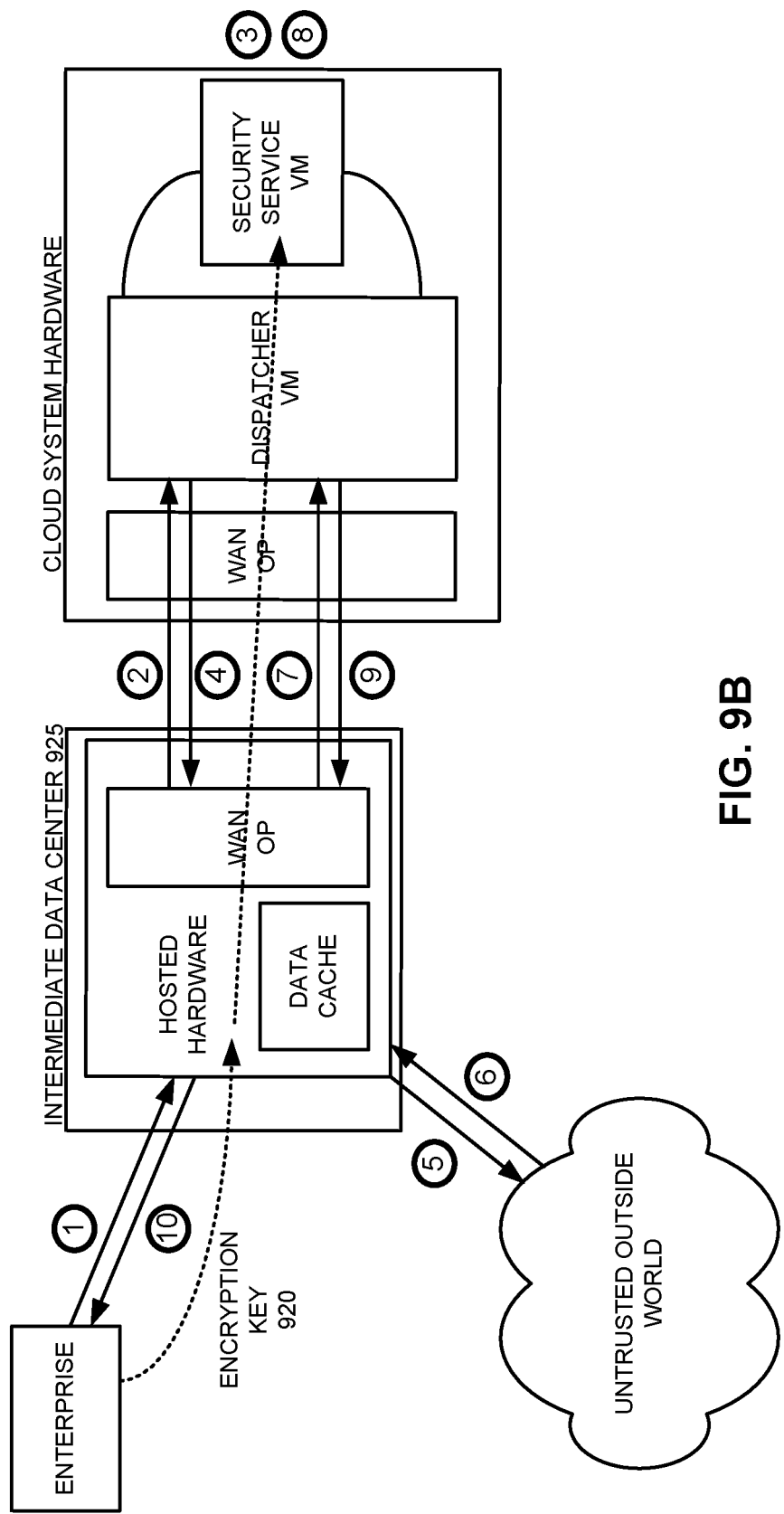
FIG. 9B illustrates a second exemplary scenario in which an encryption key is forwarded to a cloud-based security system in accordance with an embodiment.

In some embodiments, key harvesting techniques can also be leveraged to optimize scenarios in which an intermediate data center is used to optimize data transfer costs for cloud-based security services (as described in the above-referenced pending U.S. patent application Ser. No. 15/842,848, which discloses techniques in which the amount of data that is sent into the cloud-based security stack remains the same, but an intermediary computing device is used to substantially decrease the amount of data that needs to be transferred out of the cloud-based security stack). For instance, in the scenario of FIG. 9B, an enterprise agent on an enterprise client (not shown) may be configured to use key harvesting techniques to retrieve and forward an encryption key 920 to the hosted hardware in the intermediate data center 925, which can then decrypt and analyze the traffic being encrypted with encryption key 920 to determine whether to (1) bypass cloud processing for certain traffic (e.g., because the decrypted contents can be determined to not be harmful) or (2) enhance the cloud-based security processing by sending a synthesized unencrypted request (as described above) through the cloud-based security system and/or forwarding the encryption key to the cloud-based security service VM to enable deeper analysis. Note that, as in the preceding example, a traffic flow can be decrypted, synthesized, and halted if there are any issues (in this case, both in the hosted hardware of the intermediate data center 925 or in the cloud-based security service). Note also that these and the preceding techniques rely on the capability to extract an encryption key for a traffic flow; without the correct encryption key, such options are infeasible.

Computing Environment

Figure 7:
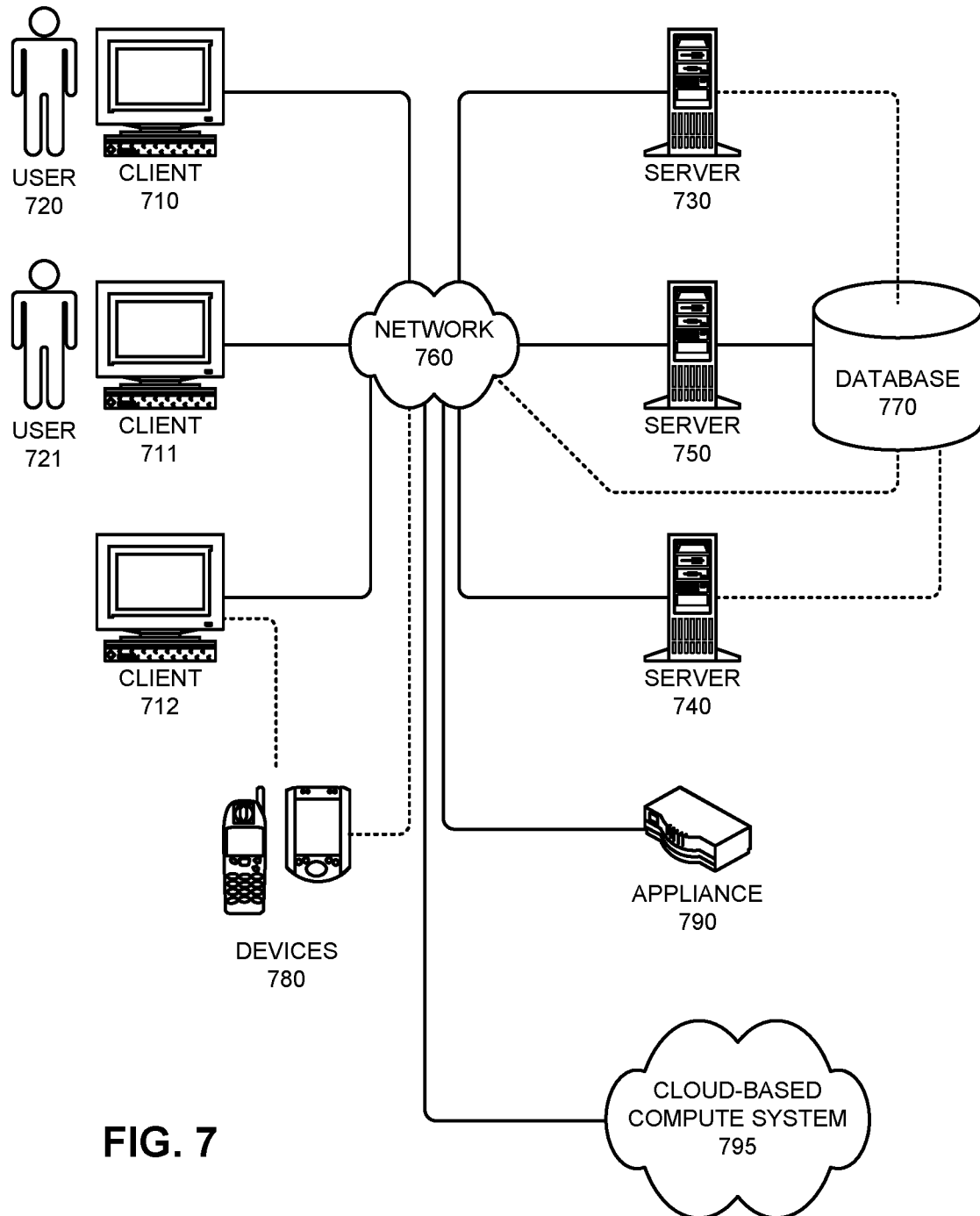
FIG. 7 illustrates a computing environment in accordance with an embodiment.

In summary, embodiments of the present invention leverage key harvesting capabilities to enable monitoring services. In some embodiments of the present invention, techniques for leveraging key harvesting capabilities can be incorporated into a wide range of computing devices in a computing environment. For example, FIG. 7 illustrates a computing environment 700 in accordance with an embodiment of the present invention. Computing environment 700 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 7, computing environment 700 includes clients 710-712, users 720 and 721, servers 730-750, network 760, database 770, devices 780, appliance 790, and cloud-based storage system 795.

Clients 710-712 can include any node on a network that includes computational capability and includes a mechanism for communicating across the network. Additionally, clients 710-712 may comprise a tier in an n-tier application architecture, wherein clients 710-712 perform as servers (servicing requests from lower tiers or users), and wherein clients 710-712 perform as clients (forwarding the requests to a higher tier).

Similarly, servers 730-750 can generally include any node on a network including a mechanism for servicing requests from a client for computational and/or data storage resources. Servers 730-750 can participate in an advanced computing cluster, or can act as stand-alone servers. For instance, computing environment 700 can include a large number of compute nodes that are organized into a computing cluster and/or server farm. In one embodiment of the present invention, server 740 is an online "hot spare" of server 750.

Users 720 and 721 can include: an individual; a group of individuals; an organization; a group of organizations; a computing system; a group of computing systems; or any other entity that can interact with computing environment 700.

Network 760 can include any type of wired or wireless communication channel capable of coupling together computing nodes. This includes, but is not limited to, a local area network, a wide area network, or a combination of networks. In one embodiment of the present invention, network 760 includes the Internet. In some embodiments of the present invention, network 760 includes phone and cellular phone networks.

Database 770 can include any type of system for storing data in non-volatile storage. This includes, but is not limited to, systems based upon magnetic, optical, or magneto-optical storage devices, as well as storage devices based on flash memory and/or battery-backed up memory. Note that database 770 can be coupled: to a server (such as server 750), to a client, or directly to a network. Alternatively, other entities in computing environment 700 (e.g., servers 730-450) may also store such data.

Devices 780 can include any type of electronic device that can be coupled to a client, such as client 712. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 780 can be coupled directly to network 760 and can function in the same manner as clients 710-712.

Appliance 790 can include any type of appliance that can be coupled to network 760. This includes, but is not limited to, routers, switches, load balancers, network accelerators, and specialty processors. Appliance 790 may act as a gateway, a proxy, or a translator between server 740 and network 760.

Cloud-based compute system 795 can include any type of networked computing devices (e.g., a federation of homogeneous or heterogeneous storage devices) that together provide computing and data storage capabilities to one or more servers and/or clients.

Note that different embodiments of the present invention may use different system configurations, and are not limited to the system configuration illustrated in computing environment 700. In general, any device that includes computational and storage capabilities may incorporate elements of the present invention.

Figure 8:
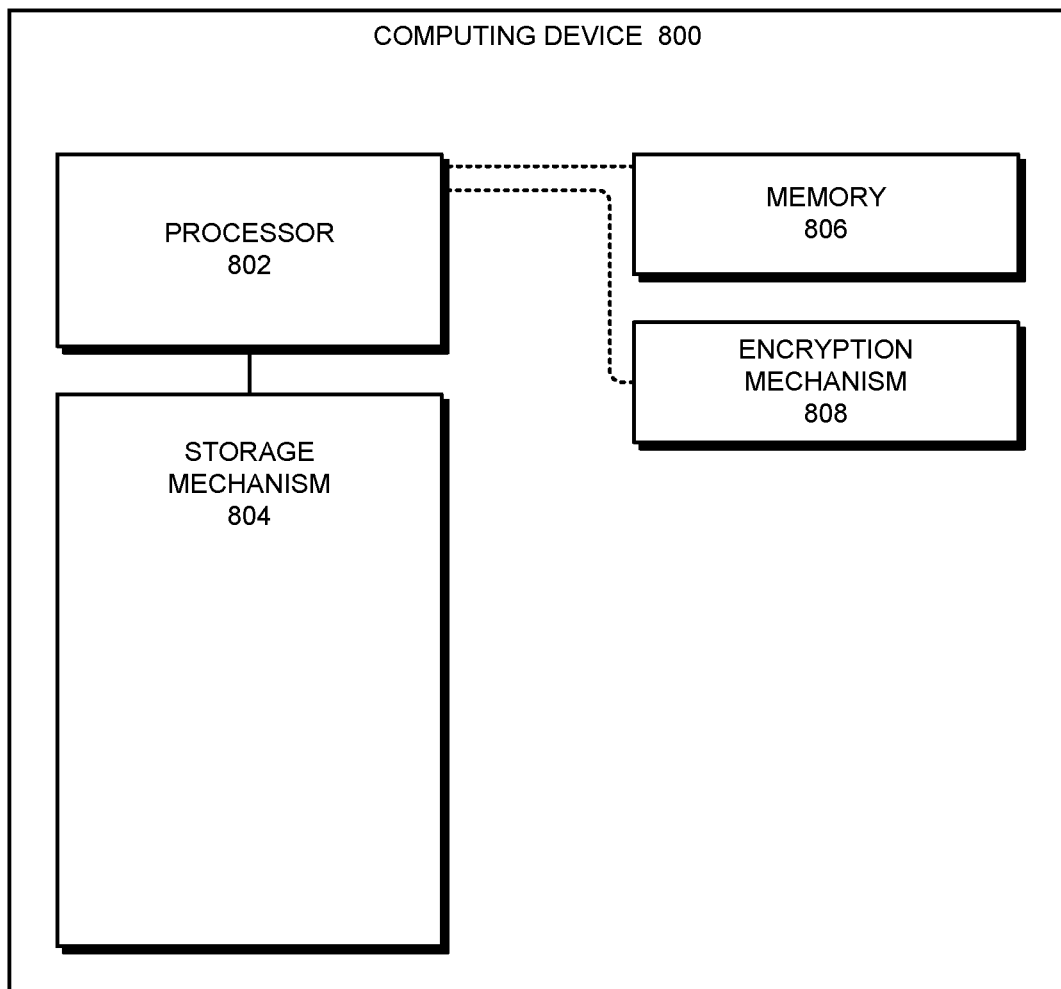
FIG. 8 illustrates a computing device in accordance with an embodiment.

FIG. 8 illustrates a computing device 800 that includes a processor 802 and a storage mechanism 804. Computing device 800 also includes a memory 806 and an encryption mechanism 808.

In some embodiments, computing device 800 uses processor 802, memory 806, encryption mechanism 808, and storage mechanism 804 to perform functions that facilitate leveraging key harvesting capabilities. For instance, computing device 800 can execute instrumented sub-programs or memory scans on processor 802 that inspect, analyze, and traverse the contents of memory 806 to extract desired data, such as an encryption key. Program instructions executing on processor 802 can verify the safety of instrumented sub-programs as well as use the encryption key to decrypt encrypted messages received by encryption mechanism 808 or stored in storage mechanism 804. Note that in many embodiments, processor 802 supports executing multiple different lightweight services in a single VM using docker containers.

In some embodiments of the present invention, some or all aspects of memory 806, encryption mechanism 808, and/or storage mechanism 804 can be implemented as dedicated hardware modules in computing device 800. These hardware modules can include, but are not limited to, processor chips, application-specific integrated circuit (ASIC) chips, field-programmable gate arrays (FPGAs), memory chips, and other programmable-logic devices now known or later developed.

Processor 802 can include one or more specialized circuits for performing the operations of the mechanisms. Alternatively, some or all of the operations of memory 806, encryption mechanism 808, and/or storage mechanism 804 may be performed using general-purpose circuits in processor 802 that are configured using processor instructions. Thus, while FIG. 8 illustrates encryption mechanism 808, memory 806, and/or storage mechanism 804 as being external to processor 802, in alternative embodiments some or all of these mechanisms can be internal to processor 802.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for extracting encryption keys to enable monitoring services, the method comprising:
   detecting an encrypted connection on a computing device;
   harvesting an encryption key for the encrypted connection from the memory of the computing device; and
   forwarding the encryption key to an intercepting agent in an intermediate computing environment that intercepts encrypted traffic that is sent between the computing device and a remote service via the encrypted connection,
   wherein establishing the encrypted connection between the computing device and the remote service comprises:
      initiating an asymmetric encryption handshake with the remote service to generate a shared symmetric key as the encryption key for the encrypted connection;
      using a pinned certificate that is verified to ensure an end-to-end encrypted connection between the computing device and the remote service, thereby ensuring that no man-in-the-middle proxy can masquerade as the remote service;
   wherein the intercepting agent intercepts and stores encrypted traffic that is sent between the computing device and remote service and uses the shared symmetric key to decrypt and analyze the encrypted traffic; and
   wherein the intercepting agent tracks and manages the shared symmetric key only for the duration of the encrypted connection, which is substantially shorter than the lifetime of the pinned certificate.

2. The computer-implemented method of claim 1,
wherein establishing the encrypted connection further comprises:
receiving a pinned certificate from the remote service, wherein using the pinned certificate comprises validating the pinned certificate against a known, trusted, locally-stored copy of the remote service's certificate to ensure that the encrypted connection cannot be intercepted by a man-in-the-middle proxy using a modified certificate authority;
verifying that the pinned certificate matches trusted local validation information associated with the remote service; and
exchanging information using Diffie-Hellman perfect forward secrecy key establishment techniques to generate the encryption key.

3. The computer-implemented method of claim 2, wherein using and verifying the pinned certificate for the encrypted connection ensures an end-to-end encrypted connection between the computing device and the remote service and that no man-in-the-middle proxy can masquerade as the remote service to intercept encrypted communication between the computing device and the remote service.

4. The computer-implemented method of claim 3,
wherein the intercepting agent uses the shared symmetric key to decrypt and analyze the encrypted traffic generated by the computing device without modifying the data streams that are sent between the computing device and the remote service.

5. The computer-implemented method of claim 4, wherein the intercepting agent, upon detecting an undesired operation or data value in the encrypted traffic, is configured to perform at least one of raising an alert or terminating one or more applications executing on the computing device that are sending data via the encrypted connection.

6. The computer-implemented method of claim 5,
wherein the intercepting agent is a cloud-based security service that executes in a dispatcher virtual machine (VM) executing in a cloud data center;
wherein the cloud-based security service receives from an application on the computing device a network request to the remote service;
wherein the remote service is in an untrusted network that is external to and distinct from the cloud data center and an enterprise location in which the application is executing;
wherein the cloud-based security service comprises a set of one or more security service VMs executing in the cloud data center that use the encryption key to decrypt and analyze the network request; and
wherein, upon determining in the set of one or more security service VMs that the network request is permitted, the cloud-based security service forwards the network request to the untrusted network.

7. A non-transitory computer-readable storage medium storing instructions that when executed by a computer cause the computer to perform a method for extracting encryption keys to enable monitoring services, the method comprising:
detecting an encrypted connection on a computing device;
harvesting an encryption key for the encrypted connection from the memory of the computing device; and
forwarding the encryption key to an intercepting agent in an intermediate computing environment that intercepts encrypted traffic that is sent between the computing device and a remote service via the encrypted connection;
wherein establishing the encrypted connection between the computing device and the remote service comprises:
initiating an asymmetric encryption handshake with the remote service to generate a shared symmetric key as the encryption key for the encrypted connection;
using a pinned certificate that is verified to ensure an end-to-end encrypted connection between the computing device and the remote service, thereby ensuring that no man-in-the-middle proxy can masquerade as the remote service;
wherein the intercepting agent intercepts and stores encrypted traffic that is sent between the computing device and remote service and uses the shared symmetric key to decrypt and analyze the encrypted traffic; and
wherein the intercepting agent tracks and manages the shared symmetric key only for the duration of the encrypted connection, which is substantially shorter than the lifetime of the pinned certificate.

8. A computing device that extracts encryption keys to enable monitoring services, comprising:
a processor that executes an operating system kernel that supports executing multiple different lightweight services in a single virtual machine using docker containers;
a harvesting mechanism; and
a memory;
wherein the harvesting mechanism is configured to detect an encrypted connection on the computing device;
wherein the harvesting mechanism harvests an encryption key for the encrypted connection from the memory; and
wherein the harvesting mechanism is configured to forward the encryption key to an intercepting agent in an intermediate computing environment that intercepts encrypted traffic that is sent between the computing device and a remote service via the encrypted connection;
wherein establishing the encrypted connection between the computing device and the remote service comprises:
using the processor to initiate an asymmetric encryption handshake with the remote service to generate a shared symmetric key as the encryption key for the encrypted connection;
using a pinned certificate that is verified to ensure an end-to-end encrypted connection between the computing device and the remote service, thereby ensuring that no man-in-the-middle proxy can masquerade as the remote service;
wherein the intercepting agent intercepts and stores encrypted traffic that is sent between the computing device and remote service and uses the shared symmetric key to decrypt and analyze the encrypted traffic; and
wherein the intercepting agent tracks and manages the shared symmetric key only for the duration of the encrypted connection, which is substantially shorter than the lifetime of the pinned certificate.

* * * * *